(12) United States Patent
Hó et al.

(10) Patent No.: US 6,214,533 B1
(45) Date of Patent: Apr. 10, 2001

(54) THERMALLY DEVELOPABLE PHOTOSENSITIVE MATERIAL

(75) Inventors: Socman Hó; Nobuaki Kagawa, both of Hino (JP)

(73) Assignee: Konica Corporation (JP)

(*) Notice: Subject to any disclaimer, the term of this patent is extended or adjusted under 35 U.S.C. 154(b) by 0 days.

(21) Appl. No.: 09/286,056

(22) Filed: Apr. 5, 1999

(30) Foreign Application Priority Data

Apr. 10, 1998 (JP) .................................................. 10-098910

(51) Int. Cl.$^7$ ............................ G03C 1/498; G03C 1/20
(52) U.S. Cl. ........................ 430/584; 430/607; 430/613; 430/614
(58) Field of Search ................................... 440/603, 607, 440/584, 586, 587, 588, 613, 614

(56) References Cited

U.S. PATENT DOCUMENTS

| | | | |
|---|---|---|---|
| 5,496,689 | * 3/1996 | Ogawa | 430/505 |
| 5,851,753 | * 12/1998 | Yamada et al. | 430/603 |
| 5,948,608 | * 9/1999 | Inagaki et al. | 430/619 |
| 5,952,167 | * 9/1999 | Okada et al. | 430/619 |
| 5,965,346 | 10/1999 | Inagaki et al. | |

FOREIGN PATENT DOCUMENTS

| | | |
|---|---|---|
| 0559228 | 8/1993 | (EP) . |
| 0805376 | 5/1997 | (EP) . |
| 95926 | 1/1997 | (JP) . |
| 1048773 | 2/1998 | (JP) . |

OTHER PUBLICATIONS

European Search Report EP 99 30 2808 XP–002126669 – Fuji Photo Film Co. Ltd. Jan. 10, 1997 (one page Abstract).

* cited by examiner

Primary Examiner—Thorl Chea
(74) Attorney, Agent, or Firm—Jordan B. Bierman; Bierman, Muserlian and Lucas

(57) ABSTRACT

A thermally developable photosensitive material is disclosed. The thermally developable photosensitive material comprises at least one of dye represented by Formula I-a through I-d and at least one of compound represented by Formula 2. The chemical formula is described in the specification.

14 Claims, No Drawings

THERMALLY DEVELOPABLE PHOTOSENSITIVE MATERIAL

FIELD OF THE INVENTION

The present invention relates to a thermally developable photosensitive material, and specifically to a thermally developable photosensitive material in which without accompanying degradation of image lasting quality, fog is minimized, and a decrease in sensitivity as well as pre-exposure storage stability are also improved.

Thermally developable photosensitive materials, which form photographic images employing a thermally developable processing method, are disclosed, for example, in U.S. Pat. Nos. 3,152,904 and 3,457,075, and D. Morgan and B. Shely, "Thermally Processed Silver Systems" (Imaging Processes and Materials, Neblette 8th edition, edited by Sturge, V. Walworth, A. Shepp, page 2, 1969). Such thermally developable materials comprise a reducible silver source (for, example, organic silver salts), light catalysts (for example, silver halides) in a catalytically active amount, and reducing agents which are generally dispersed in a (an organic) binder matrix. The thermally developable photosensitive materials are stable at normal temperature, and after exposure, when they are heated to high temperatures (for example, at least 80° C.), silver is formed through an oxidation-reduction reaction of the reducible silver source (working as an oxidizing agent) with a reducing agent. This oxidation-reduction reaction is accelerated with a catalytic action of a latent image formed by exposure. Silver formed by the reaction of an organic silver salt in an exposed area provides a black image. This is in contrast to the unexposed area, and thereby forms an image. Antifoggants to minimize fog in the formed image are employed, if desired. The most effective method as the conventional fog retardation technique was a method in which mercury compounds were employed as antifoggants. Incorporation of mercury compounds as antifoggants in photosensitive materials is disclosed, for example, in U.S. Pat. No. 3,589,903. However, mercury compounds are not environmentally desired and development of mercury-free antifoggants has been demanded. As mercury-free antifoggants, heretofore, various types of polyhalides have been disclosed (for example, refer to U.S. Pat. Nos. 3,874,946, 4,756,999, and 5,340,712; European Patent Nos. 605,981A1, 622,666A1, and 631,176A1; Japanese Patent Publication No. 54-165; and Japanese Patent Publication Open to Public Inspection No. 7-2781). However, these described compounds caused problems in which fog preventing capability was low or silver tone was degraded. Furthermore, those having excellent fog inhibiting capability caused a problem with a decrease in sensitivity. Thus improvements have been sought. Furthermore, there has been a problem in which when photosensitive materials piled up in the layer structure are stored under forcibly heated and humidified conditions, and then, were subjected to exposure and development, fog in the unexposed area increased. Thus the development of antifoggants has been desired which do not cause these problems. As methods to overcome these problems, polyhalides which bring about improvement in the above-mentioned problems are described in each of issues of Japanese Patent Publication Open to Public Inspection Nos. 9-160164, 9-244178, 9-258367, 9-265150, 9-281640, and 9-319022. However, when these compounds are applied specifically to a thermally developable photosensitive material for a medical laser imager or a thermally developable photosensitive material, comprising a contrast increasing agent, for output of a printing image setter having oscillating wavelengths of 600 to 800 nm, the above-mentioned problems are overcome fairly well. However, on the other hand, a problem has been caused in which the image stability, with the passage of time, is not sufficient enough in such a manner that the fog of the processed sample increases as time passes.

SUMMARY OF THE INVENTION

Accordingly, an object of the present invention is to provide a thermally developable photosensitive material which does not result in an increase in fog with the passage of time, and to provide a thermally developable photosensitive material for a laser imager, which exhibits high sensitivity, minimum fog, and excellent storage stability of a pre-exposure photosensitive material, and a thermally developable photosensitive material for the output film of an image setter, which exhibits high contrast forming properties, high sensitivity, minimum fog, and excellent storage stability of pre-exposure photosensitive material.

MEANS FOR SOLVING THE PROBLEM BY THE PRESENT INVENTION

The object is accomplished by the following invention.

A thermally developable photosensitive material has a support and at least one emulsion layer comprising a binder and photosensitive silver halide provided on the support, wherein the thermally developable photosensitive material comprises at least one of dye represented by Formula I-a through I-d and at least one of compound represented by Formula 2.

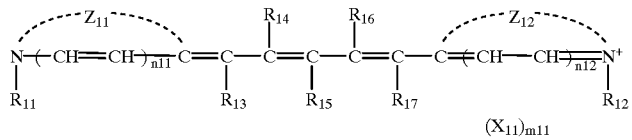

[I-a]

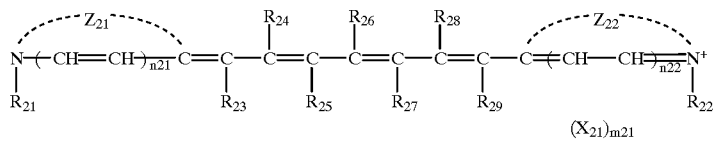

[I-b]

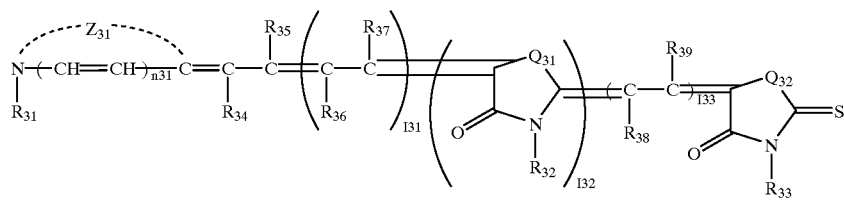

[I-c]

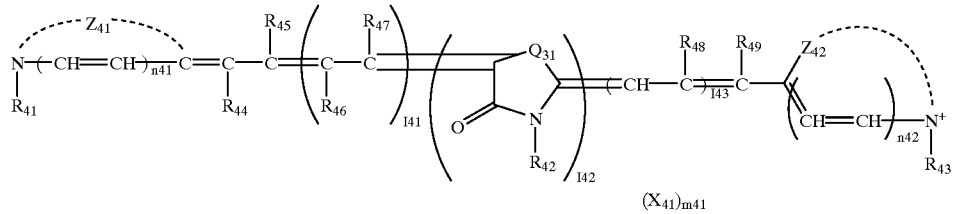

[I-d]

In the formula, each of $Z_{11}$, $Z_{12}$, $Z_{21}$, $Z_{22}$, $Z_{31}$, $Z_{41}$ and $Z_{42}$ represents non-metallic atom group necessary to form 5 member or 6 member nitrogen-containing heterocycle of monocyclic ring or condensed ring. Each of $Q_{31}$, $Q_{32}$ and $Q_{41}$ represents an oxygen atom, sulfur atom, selenium atom or —N(R)— wherein R represents an alkyl, aryl or heterocyclic group. Each of $R_{11}$, $R_{12}$, $R_{21}$, $R_{22}$, $R_{31}$, $R_{41}$ and $R_{43}$ represents an aliphatic group; each of $R_{32}$, $R_{33}$ and $R_{42}$ represents an alkyl, aryl or heterocyclic group. Each of $R_{13}$, $R_{14}$, $R_{15}$, $R_{16}$, $R_{17}$, $R_{23}$, $R_{24}$, $R_{25}$, $R_{26}$, $R_{27}$, $R_{28}$, $R_{29}$, $R_{34}$, $R_{35}$, $R_{36}$, $R_{37}$, $R_{38}$, $R_{39}$, $R_{44}$, $R_{45}$, $R_{46}$, $R_{47}$, $R_{48}$ and $R_{49}$, represents a hydrogen atom, or a non-substituted or substituted alkyl, alkoxy, aryloxy, aryl, —N($W_1$, $W_2$), —SR or heterocyclic group, R represents an alkyl, aryl or heterocyclic group here; each of $W_1$ and $W_2$ represents a non-substituted or substituted alkyl or aryl group, or $W_1$ and $W_2$ can form nitrogen-containing heterocycle of 5 member or 6 member by bonding with mutually; each couple of $R_{11}$ and $R_{13}$, $R_{14}$ and $R_{16}$, $R_{17}$ and $R_{12}$, $R_{21}$ and $R_{23}$, $R_{24}$ and $R_{26}$, $R_{25}$ and $R_{27}$, $R_{26}$ and $R_{28}$, $R_{22}$ and $R_{29}$, $R_{31}$ and $R_{34}$, $R_{35}$ and $R_{37}$, $R_{41}$ and $R_{44}$, $R_{45}$ and $R_{47}$, and $R_{49}$ and $R_{43}$ can form 5 member or 6 membered-ring by bonding with mutually; each of $X_{11}$, $X_{21}$ and $X_{41}$ represents an ion necessary to cancel charges in a molecule; each of $m_{11}$, $m_{21}$, and $m_{41}$, represents a number of ion necessary to cancel charges in a molecule. Each of $n_{11}$, $n_{12}$, $n_{21}$, $n_{22}$, $n_{31}$, $n_{41}$ and $n_{42}$ is 0 or 1, and each of $l_{31}$, $l_{32}$, $l_{33}$, $l_{41}$, $l_{42}$ and $l_{43}$ is 0 or 1.

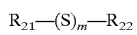 Formula (2)

In the formula, each of $R_{21}$ and $R_{22}$ represents aliphatic group, aromatic group or heterocyclic group. At least one of $R_{21}$ and $R_{22}$ represents atom group which can form a ring by bonding with (S)m together with. And $R_{21}$ and $R_{22}$ may be different or same. M represents an integer of 2–6.

Preferable example of the optical sensitizing dye represented by Formula I-a is a compound represented by formula Formula I-e or I-f shown below.

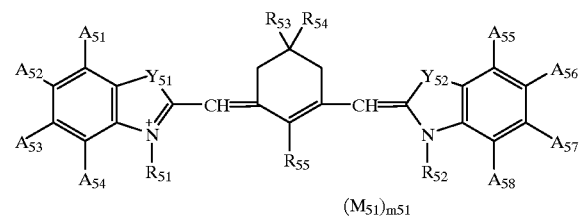

[I-e]

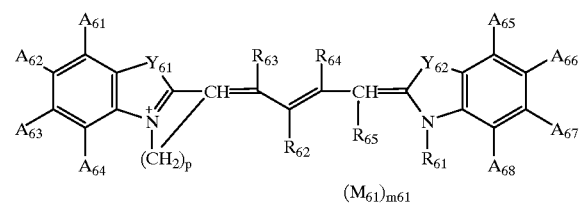

[I-f]

In the formula, each of $Y_{51}$, $Y_{52}$, $Y_{61}$ and $Y_{62}$ represents oxygen atom, sulfur atom, selenium atom or —(NR$_0$)—. $R_0$ represents aliphatic group. Each of $R_{51}$ and $R_{52}$ represents an aliphatic group. $R_{61}$ represents an aliphatic group or a non-metallic atom group necessary to form a 5 member or 6 member condensed ring by bonding together with $R_{65}$. Each of $R_{53}$ and $R_{54}$ represents a hydrogen atom, alkyl group, aryl or heterocyclic group. Each of $R_{55}$ and $R_{62}$ represents a hydrogen atom, alkyl group, aryl group, heterocyclic group, halogen atom, alkoxy group, aryloxy group, alkylthio group, arylthio group or amino group. Each of $R_{63}$ and $R_{64}$ represents a hydrogen atom, alkyl group or a non-metallic atom group necessary to form a 5 member or 6 member condensed ring by bonding with $R_{63}$ and $R_{64}$. $R_{65}$ represents a hydrogen atom or simple bond to $R_{61}$. Each of $A_{51}$ to $A_{58}$ and $A_{61}$ to $A_{68}$ represents hydrogen atom or a substituent. At least one of a combination of $A_{51}$ and $A_{52}$, $A_{52}$ and $A_{53}$, $A_{53}$ and $A_{54}$, A55 and $A_{56}$, $A_{56}$ and $A_{57}$, $A_{57}$ and $A_{58}$, and at least one of a combination of $A_{61}$ and $A_{62}$, $A_{62}$ and $A_{63}$, $A_{63}$ and $A_{64}$, $A_{65}$ and $A_{66}$, $A_{66}$ and $A_{67}$, $A_{67}$ and $A_{68}$ can form condensed naphthyl ring by bonding mutually. Each of $M_{51}$, and $M_{61}$ represents an ion necessary to cancel. Each of $m_{51}$ and $m_{61}$ represents a number of ion necessary to cancel charges in a molecule. p is 2 or 3.

Other preferable example of the optical sensitizing dye represented by Formula I-b is a compound represented by formula Formula I-g, I-h or I-i shown below.

[I-g]

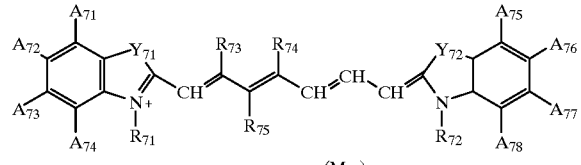

$(M_{71})_{m71}$

[I-h]

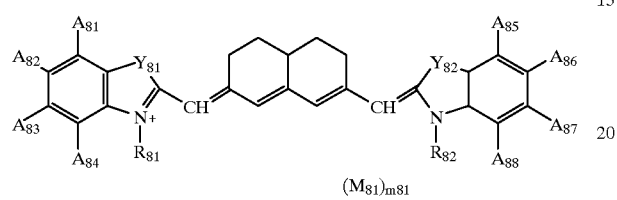

$(M_{81})_{m81}$

[I-i]

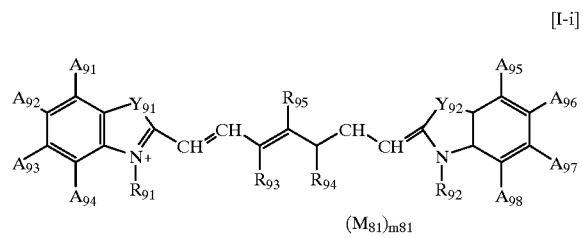

$(M_{81})_{m81}$

In the formula, each of $Y_{71}$, $Y_{72}$, $Y_{81}$, $Y_{82}$, $Y_{91}$, and $Y_{92}$, represents an oxygen atom, sulfur atom, selenium atom or —(NR$_0$)—. R$_0$ represents aliphatic group. Each of R$_{71}$, R$_{72}$, R$_{81}$, R$_{82}$, R$_{91}$ and R$_{92}$ represents an aliphatic group. Each combination of R$_{73}$ and R$_{74}$ and R$_{93}$ and R$_{94}$ non-metallic atom group necessary to form a 5 member or 6 member condensed ring by bonding. Each of R$_{75}$ and R$_{95}$ represents a hydrogen atom, alkyl group, aryl group, heterocyclic group, halogen atom, alkoxy group, aryloxy group, alkylthio group, arylthio group or amino group. Each of A$_{71}$ to A$_{78}$, A$_{81}$ to A$_{88}$ and A$_{91}$ to A$_{98}$ represents a hydrogen atom or a substituent. At least one of a combination of A$_{71}$ and A$_{72}$, A$_{72}$ and A$_{73}$, A$_{73}$ and A$_{74}$, A$_{75}$ and A$_{76}$, A$_{76}$ and A$_{77}$, A$_{77}$ and A$_{78}$, at least one of a combination of A$_{81}$ and A$_{82}$, A$_{82}$ and A$_{83}$, A$_{83}$ and A$_{84}$, A$_5$ and A$_{86}$, A$_{86}$ and A$_{87}$, A$_{87}$ and A$_{88}$ and at least one of a combination of A$_{91}$ and A$_{92}$ A$_{92}$ and A$_{93}$, A$_{93}$ and A$_{94}$, A$_{95}$ and A$_{96}$, A$_{96}$ and A$_{97}$ A$_{97}$ and A98 can form condensed naphthyl ring by bonding mutually. Each of M$_{71}$, M$_{81}$ and M$_{91}$ represents an ion necessary to cancel. Each of m$_{71}$, m$_{81}$ and m$_{91}$ represents a number of ion necessary to cancel charges in a molecule.

Preferable embodiment of the thermal developable photosensitive material is that the optical sensitizing dye represented by Formula I-a is a compound represented by formula Formula I-e or I-f and the optical sensitizing dye represented by Formula I-b is a compound represented by formula Formula I-g, I-h or I-i shown below.

In the other embodiment of the thermally developable photosensitive material further comprises at least one compound represented by the following formula 3, 4 or 5:

Formula 3

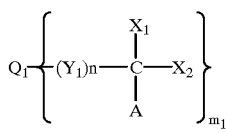

$X_1$ and $X_2$ each represents a halogen atom. $Y_1$ represents a divalent linking group. "A" represents a hydrogen atom, a halogen atom or another electron attractive group. "m" represents an integer of 3 or 4. Q represents a heterocyclic group, an aryl group or an aliphatic group. "n" represents an integer of 0 to 3. When Q represents an aliphatic group, the number of total halogen atoms in a molecule is 6 to 10.

Formula 4

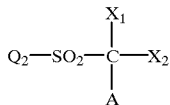

$X_1$, $X_2$ and "A" each has the same meaning of $X_1$, $X_2$ and "A" in the Formula 3 respectively. Q represents each group of an aromatic hetero 5-membered ring having one oxygen atom and 2 or 3 of nitrogen atoms, a furan ring, a thiophene ring or a pyrrole ring, provided that, when Q is a thiophene ring, $X_1$ represents a bromine atom.

Formula 5

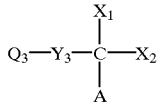

$X_1$, $X_2$ and "A" each has the same meaning of $X_1$, $X_2$ and "A" in the Formula 3 respectively. $Y_3$ represents —SO—, —CO—, —N(R$_{11}$), —SO$_2$—, —N(R$_{11}$)—CO—, —N(R$_{11}$)COO—, —COCO—, —COO—, —OCO—, —OCOO—, —SCO—, —SCOO—, —C(Z$_1$)(Z$_2$)—, alkylene, arylene, a divalent hetero ring or a divalent linking group formed by arbitrary combinations thereof. R$_{11}$ represents a hydrogen atom or an alkyl group. Z$_1$ and Z$_2$ each represents a hydrogen atom or an electron attractive group. Z$_1$ and Z$_2$ shall not represent a hydrogen atom at the same time. Q represents an aliphatic group, an aromatic group or a heterocyclic group, with proviso that, when $Y_3$ is —SO—, Q represents an aromatic 5-membered heterocyclic ring having at least one hetero atom, except for N, or a pyridine ring group.

thermally developable photosensitive material each of the items 1–5 characterized by that it is laser exposure use.

DETAILED DESCRIPTION OF THE INVENTION

The invention is described in detail as follows. Optical sensitizing dye represented by Formulas I-a to I-d and I-e or I-i is described.

As nitrogen-containing 5 or 6-member heterocycle represented by $Z_{11}$, $Z_{12}$, $Z_{21}$, $Z_{22}$, $Z_{31}$, $Z_{41}$ and $Z_{42}$ in Formulas I-a to I-d includes oxazole rings (oxazolidine ring, oxazoline ring, benzoxazole ring, tetrahydrobenzoxazole ring, naphthoxazole ring, benznaphthoxazole ring), imidazole rings (imidazolidine ring, imidazoline ring, benzimidazole ring, tetrahydrobenzoimidazole ring, naphthimidazole ring, benznaphthimidazole ring), thiazole rings (thiazolidine ring, thiazoline ring, benzothiazole ring, tetrahydrobenzothiazole ring, naphthothiazole ring, benzonaphthothiazole ring), selenazole rings (selenazolidine ring, selenazoline ring, benzoselenazole ring, tetrahydrobenzoselenazole ring, naphthoselenazole ring, benzonaphthselenazole ring), tellurazole rings (tellurazolidine ring, tellurazoline ring, benzotellurazolazole ring), pyridine nucleus (pyridine, chinoline), and pyrrole rings (pyrrolidine ring, pyroline ring, pyrrole ring, 3,3-dialkylindolenine ring). These ring may be substituted by a group which can substitute described later as for $A_{51}$ to $A_{98}$.

An example of aliphatic group shown in $R_0$, $R_{11}$, $R_{12}$, $R_{21}$, $R_{22}$, $R_{31}$, $R_{41}$, $R_{43}$, $R_{51}$, $R_{52}$, $R_{61}$, $R_{71}$, $R_{72}$, $R_{81}$, $R_{82}$, $R_{91}$ and $R_{92}$ includes alkyl group of branch or straight chain having 1–10 carbon atoms (methyl group, ethyl group, propyl group, butyl group, pentyl group, iso-pentyl group, 2-ethylhexyl group, octyl group, decyl group), alkenyl group having 3–10 carbon atoms (2-propenyl group, 3-butenyl group, 1-methyl-3-propenyl group, 3-pentenyl group, 1-methyl-3-butenyl group, 4-hexenyl group), aralkyl group having 7–10 carbon atoms (benzyl group, phenethyl group).

The above mentioned group may be substituted by those groups including lower alkyl group (methyl group, ethyl group, propyl group), halogen atom (fluorine atom, chlorine atom, bromine atom), vinyl group, aryl (phenyl group, p-tolyl group, p-bromophenyl group), trifluoromethyl group, alkoxy group (methoxy group, ethoxy group, methoxyethoxy group), aryloxy group (phenoxy group, p-tolyl oxy group), cyano group, sulfonyl group (methanesulfonyl group, trifluoromethane sulfonyl group, p-tosyl group), alkoxycarbonyl group (ethoxycarbonyl group, butoxycarbonyl group), amino group (amino group, biscarboxymethylamino group), aryl (phenyl group, carboxyphenyl group), heterocyclic group (tetrahydrofurfuryl, 2-pyrrolidinone-1-yl group), acyl group (acetyl group, benzoyl group), ureide group (ureide group, 3-methyl ureide group, 3-phenyl ureide group), thiouredide group (thiouredide group, 3-methylthio ureide group), alkylthio group (methylthio, ethylthio group), arylthio group (phenylthio group), heterocyclethio group (2-thienylthio group, 3-thienylthio group), carbonyloxy group (acetyloxy group, propanoyloxy group, benzoyloxy group), acylimino group (acetylamino, benzoylamino group), thioamido group (thioacetamide group, thiobenzoylamino group), or hydrophilic groups including sulfo group, carboxy group, phosphono group, sulfate group, hydroxy group, mercapto group, sulfino group, carbamoyl group (carbamoyl group, N-methylcarbamoyl group, N, N-tetramethylene carbamoyl group), sulfamoyl group (sulfamoyl group, N, N-3-oxapentamethyleneaminosulfonyl group), sulfonamide group (methane sulfonamide, butane sulfonamide group), sulfonyl aminocarbonyl group (methanesulfonyl aminocarbonyl, ethane sulfonyl aminocarbonyl group), acylamino sulfonyl group (acetamide sulfonyl, methoxy acetamide sulfonyl group), acylaminocarbonyl group (acetamide carbonyl, methoxyacetamidecarbonyl group), sulfinylaminocarbonyl group (methanesulfinylaminocarbonyl, ethanesulfinylaminocarbonyl group). The concrete examples of the aliphatic group substituted by the hydrophilic group include carboxymethyl, carboxyethyl, carboxybutyl, carboxypenthyl, 3-sulfatebutyl, 3-sulfopropyl, 2-hydroxy-3-sulfopropyl group, 4-sulfobutyl, 5-sulfopentyl, 3-sulfopentyl, 3-sulfinobutyl, 3-phosphonopropyl, hydroxyethyl, N-methanesulfonyl carbamoylmethyl, 2-carboxy-2-propenyl, o-sulfobenzyl, p-sulfophenethyl and p-carboxybenzyl.

An example of aryl group shown in R, $R_{13}$, $R_{14}$, $R_{15}$, $R_{16}$, $R_{17}$, $R_{23}$, $R_{24}$, $R_{25}$, $R_{26}$, $R_{27}$, $R_{28}$, $R_{29}$, $R_{32}$, $R_{33}$, $R_{34}$, $R_{35}$, $R_{36}$, $R_{37}$, $R_{38}$, $R_{39}$, $R_{42}$, $R_{44}$, $R_{45}$, $R_{46}$, $R_{47}$, $R_{48}$, $R_{49}$, $R_{53}$, $R_{54}$, $R_{55}$, $R_{62}$, $R_{63}$, $R_{64}$, $R_{75}$ and $R_{95}$ includes methyl group, ethyl group, butyl group, iso-butyl group. Examples of aryl group include monocyclic or polycyclic ring, such as phenyl group, naphthyl group. Examples of the each group heterocyclic group include those groups such as thienyl, furyl, pyridyl, carbazolyl, pyrrolyl, and indolyl.

These groups may have a substituent whose examples are shown as those for the aliphatic group such as R0, R11 and R92. Concrete examples of substituted alkyl group include 2-methoxyethyl, 2-hydroxyethyl, 3-ethoxycarbonylpropyl, 2-carbamoylethyl, 2-methanesulfonylethyl, 3-methanesulfonylaminopropyl, benzyl, phenethyl, carboxymethyl, carboxyethyl, allyl, 2-furyl ethyl. Concrete examples of substituted aryl group include p-carboxy phenyl, p-N, N-dimethylaminophenyl, p-morphonylphenyl, p-methoxyphenyl, 3,4-dimethoxyphenyl, 3,4-methylenedioxyphenyl, 3-chlorophenyl, p-nitrophenyl. Concrete examples of substituted heterocyclic group include 5-chloro-2-pyridyl, 5-ethoxycarbonyl-2-pyridyl, and 5-carbamoyl-2-pyridyl.

An alkyl and aryl group shown in $W_1$ and $W_2$ include those groups as for R described above.

Examples of alkoxy shown in $R_{13}$, $R_{14}$, $R_{15}$, $R_{16}$, $R_{17}$, $R_{23}$, $R_{24}$, $R_{25}$, $R_{26}$, $R_{27}$, $R_{28}$, $R_{29}$, $R_{34}$, $R_{35}$, $R_{36}$, $R_{37}$, $R_{38}$, $R_{39}$, $R_{44}$, $R_{45}$, $R_{46}$, $R_{47}$, $R_{48}$, $R_{49}$, $R_{55}$, $R_{62}$, $R_{75}$ and $R_{95}$ include methoxy group, ethoxy group, 2-methoxyethoxy group, 2-hydroxyethoxy group and examples of aryloxy group include phenoxy group, 2-naphthoxy group, 1-naphthoxy group, p-tolyloxy group, p-methoxyphenyl group.

As for groups shown in $R_{55}$, $R_{62}$, $R_{75}$ and $R_{95}$ an example of halogen atom includes fluorine atom, chloro atom, bromine atom, iodine atom, an example of alkylthio group includes methylthio group, ethylthio group, an example of arylthio group includes phenylthio group and m-chlorophenylthio group, and an example of amino group includes those substituted or non-substituted for example, amino group, methylamino group, dimethylamino group, diethylamino group, diphenylamino group, N, N-tetramethylene amino group and N, N-pentamethylene amino group.

Examples of the condensed ring which is formed by bonding of $R_{14}$ and $R_{16}$, $R_{24}$ and $R_{26}$, $R_{25}$ and $R_{27}$, $R_{26}$ and $R_{28}$, $R_{35}$ and $R_{37}$, $R_{45}$ and $R_{47}$, $R_{49}$ and $R_{43}$, $R_{63}$ and $R_{64}$, $R_{73}$ and $R_{74}$ and $R_{93}$ and $R_{94}$ mutually includes 5- or 6-member carbocyclic ring which may be saturated unsaturated. Arbitrary location can be substituted on these condensed ring, and group described with the group which the above-mentioned aliphatic group could substitute.

Examples of the condensed ring which is formed by bonding of $R_{11}$ and $R_{13}$, $R_{17}$ and $R_{12}$, $R_{21}$ and $R_{23}$, $R_{22}$ and $R_{29}$, $R_{31}$ and $R_{34}$, $R_4$, and $R_{44}$ mutually include 5- or 6-member nitrogen-containing condensed ring which may be saturated unsaturated.

Examples of the nitrogen-containing 5- or 6-member heterocycle ring which is formed by bonding of $W_1$ and $W_2$ mutually with a nitrogen atom include pyrrolidine ring, morpholine ring and piperidine ring.

Examples of the group which can be substituted shown by $A_{51}$ to $A_{58}$, $A_{61}$ to $A_{68}$, $A_{71}$ to $A_{78}$, $A_{81}$ to $A_{88}$ and $A_{91}$ to $A_{98}$ are selected arbitrarily among the following groups; lower alkyl group (methyl group, ethyl group, propyl group), halogen atom (fluorine atom, chlorine atom, bromine atom), vinyl group, styryl group, aryl (phenyl group, p-tolyl group, p-bromophenyl group), trifluoromethyl group, alkoxy group (methoxy group, ethoxy group), aryloxy group (phenoxy group, p-tolyl oxy group), carbonyl oxy group (acetyl oxy group, propanoyl oxy group, benzoyloxy group), amino group (each group such as amino, dimethylamino, anilino), heterocyclic group (pyridyl group, pyrrolyl group, furyl group, thienyl group, imidazolyl group, thiazolyl group, pyrimidinyl group), acyl group (acetyl group, benzoyl group), cyano group, sulfonyl group (methanesulfonyl group, benzenesulfonyl group), carbamoyl group (carbamoyl group, N, N-dimethylcarbamoyl group, morphonocarbonyl group), sulfamoyl group (sulfamoyl group, N-phenylsulfamoyl group, morphonosulfonyl group), acylimino group (acetylamino group, benzoylamino, o-hydroxybenzoylamino group), sulfonylamino group (methanesulfonylamino group, benzensulfonylamino group), alkoxycarbonyl group (methoxycarbonyl group, ethoxycarbonyl group, trifluoroethoxycarbonyl group), hydroxyl group and carboxyl group, sulfoxide group and alkylthio group.

Among the substituent mentioned above, preferred one is sulfoxide group, alkylthio group and aryl group, and more preferable example is sulfoxide group.

When the group having charge of cation or anion is substituted in the optical sensitizing dye represented by Formulas I-a to I-i mentioned above, counter ion is formed by equivalent anion or cation so that the charge in molecular. Among ions necessary to cancel charge in the molecule shown by $X_{11}$, $X_{21}$, $X_{41}$, $M_{51}$, $M_{61}$, $M_{71}$, $M_{81}$ and $M_{91}$, concrete examples of cation include proton, organic ammonium ion (each ion such as triethylammonium, triethanolammonium), and inorganic cation (each cation such as lithium, sodium, potassium), and concrete examples of acid anion include halide ion (chlorine ion, bromide ion, iodine ion), p-toluenesulfonic acid ion, perchlorate ion, tetrafluoroboron ion, sulfate ion, methylsulfate ion, ethylsulfuric acid ion, methanesulfonic acid ion and trifluoromethane sulfonic acid ion.

Among the optical sensitizing dye represented by Formulas I-a to I-d, those represented by the Formulas I-e and I-f are preferably employed, and, optical sensitizing dye represented by Formulas I-g to I-i are more preferably employed. Among these the dye represented by Formula I-i is specially preferable in view of sensitivity.

A typical example of compound of optical sensitizing dye represented by Formulas I-a to I-i is shown in the following.

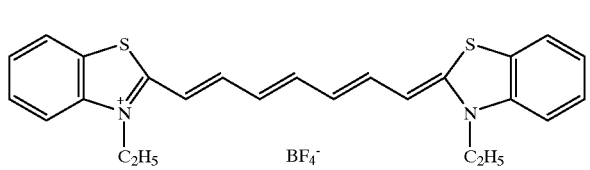

I-1

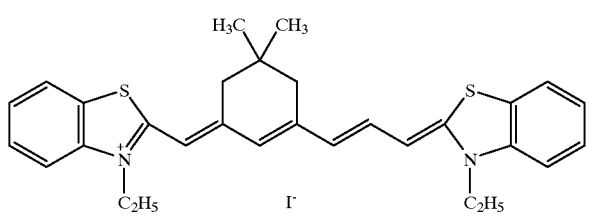

I-2

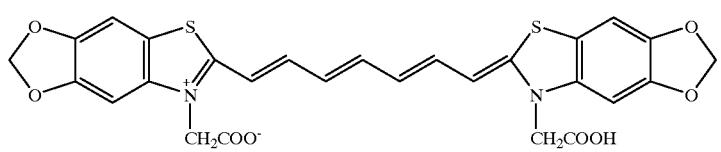

I-3

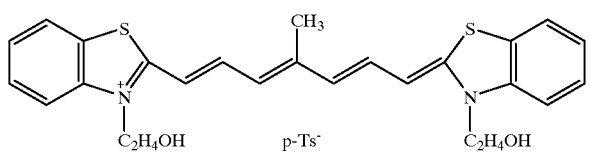

I-4

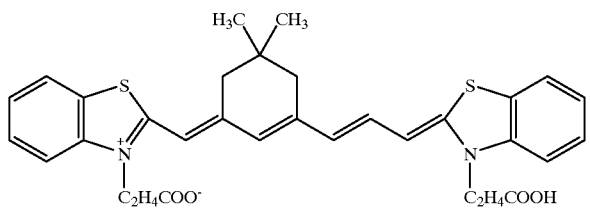

I-5

-continued
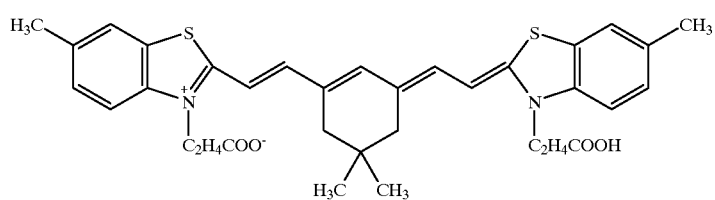
I-6
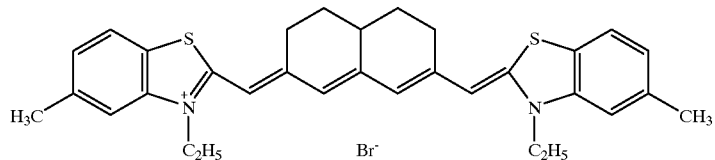
I-7
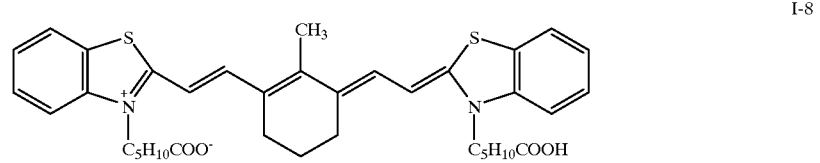
I-8
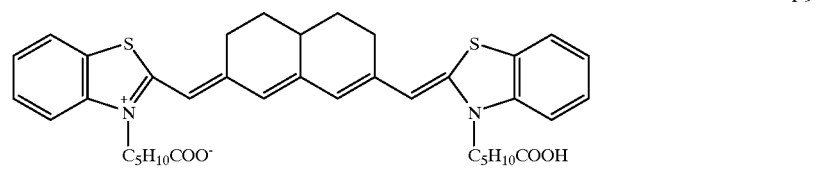
I-9
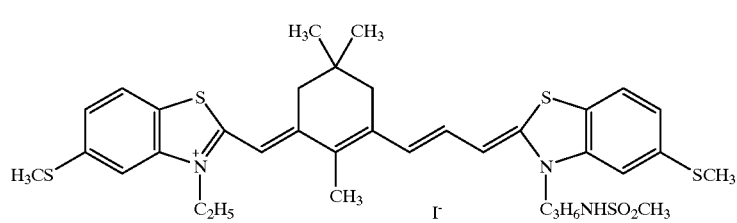
I-10
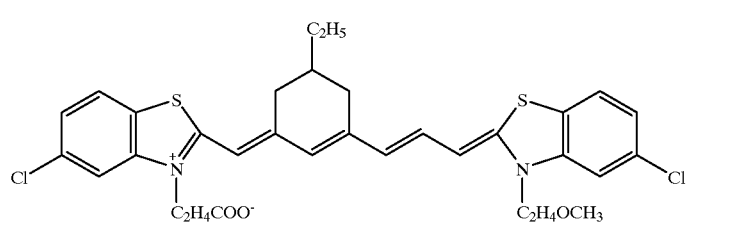
I-11
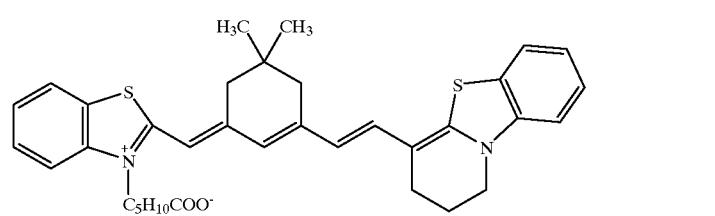
I-12
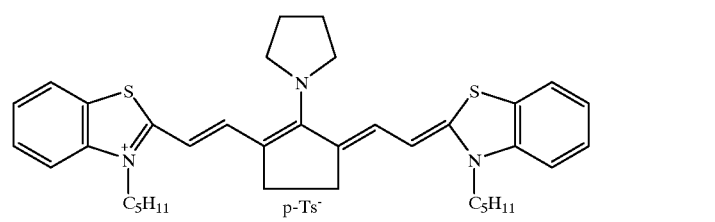
I-13

-continued
I-14
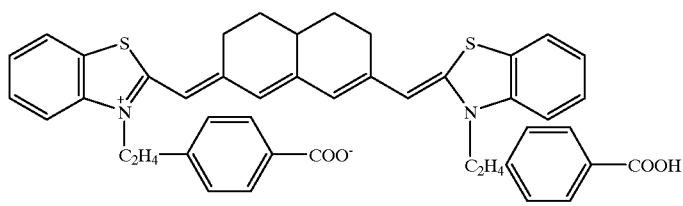
I-15
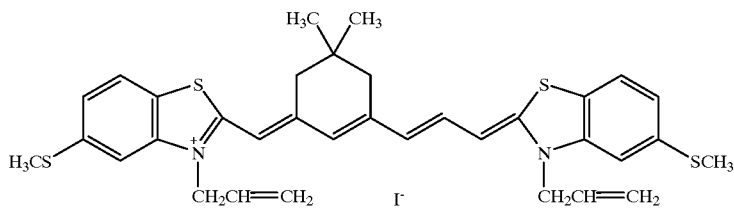
I-16
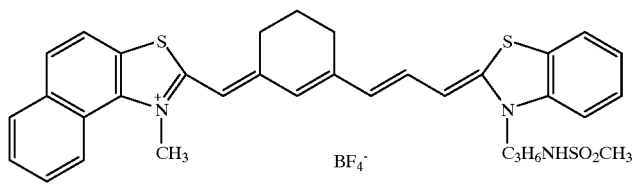
I-17
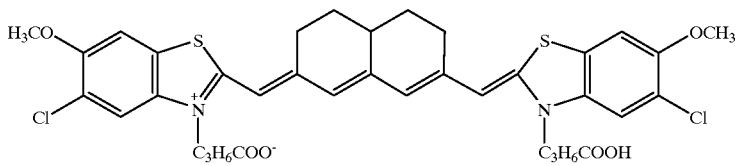
I-18
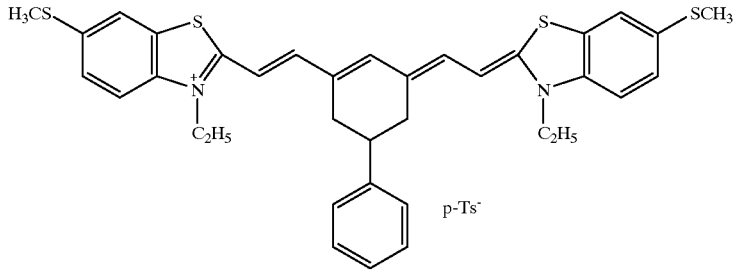
I-19
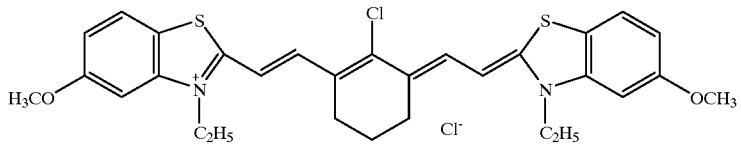
I-20
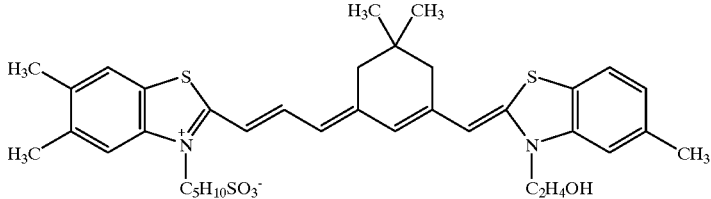

I-21
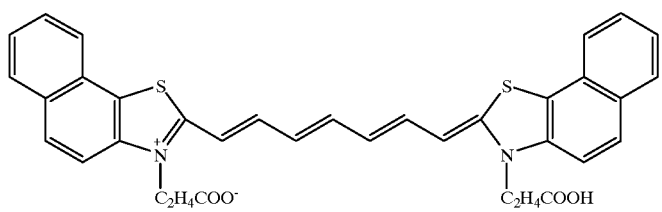
I-22
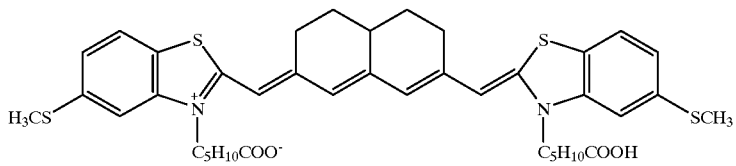
I-23
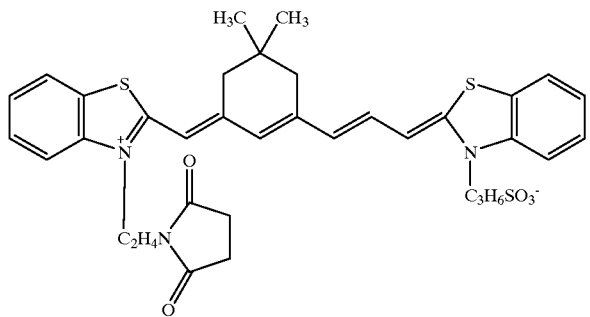
I-24
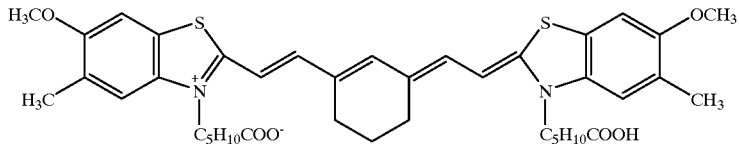
I-25
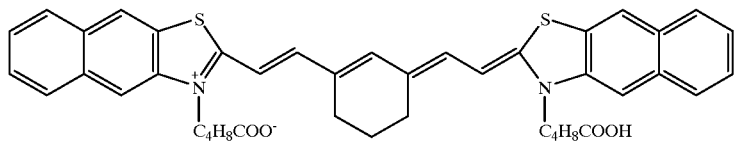
I-26
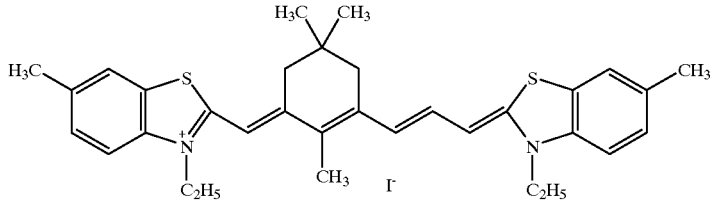
I-27
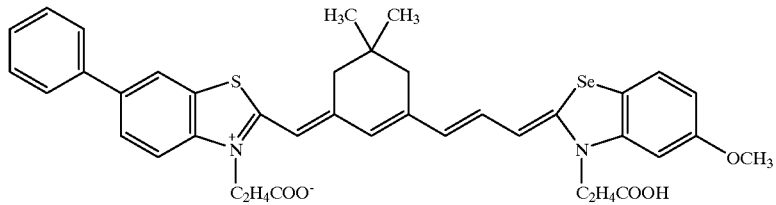

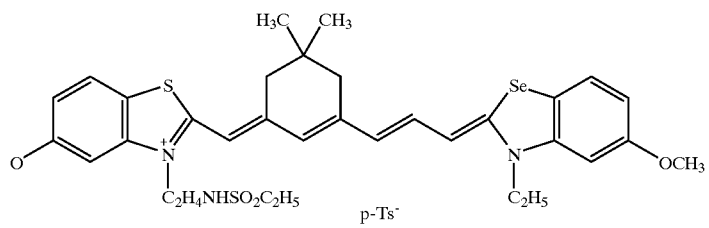
I-28
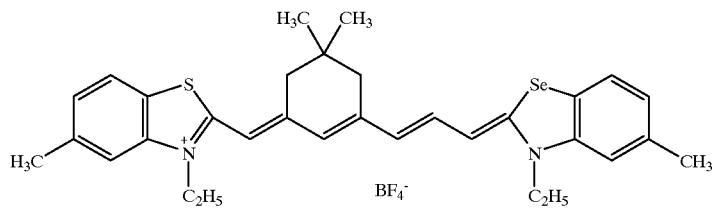
I-29
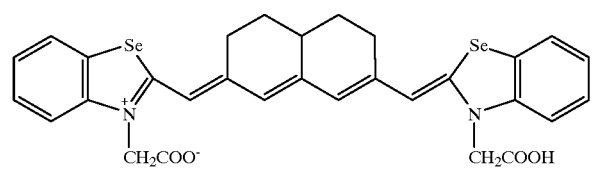
I-30
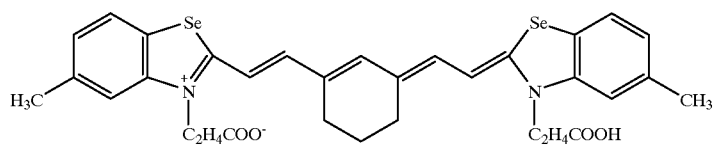
I-31
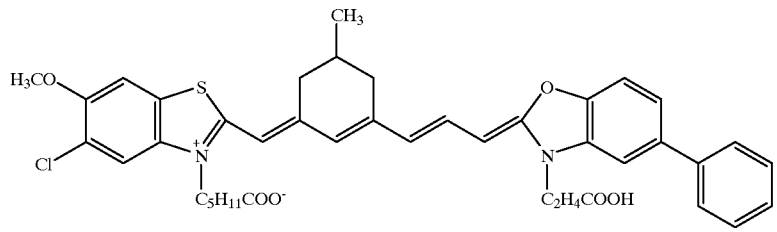
I-32
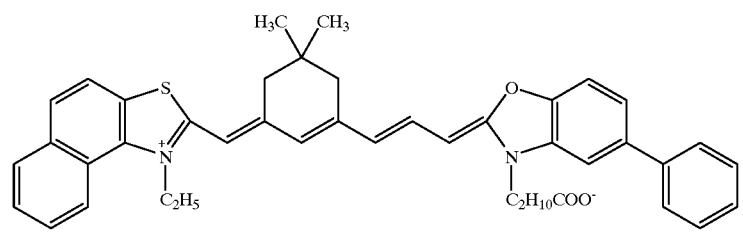
I-33
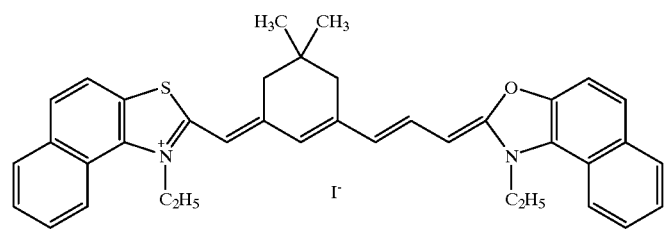
I-34

I-35
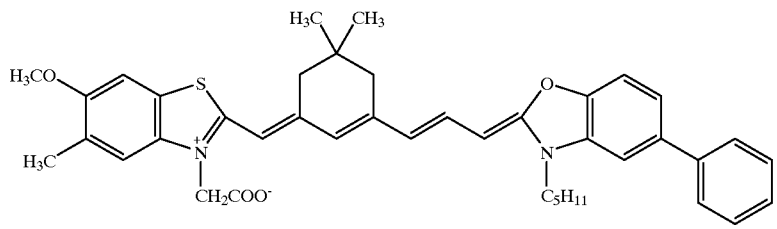
I-36
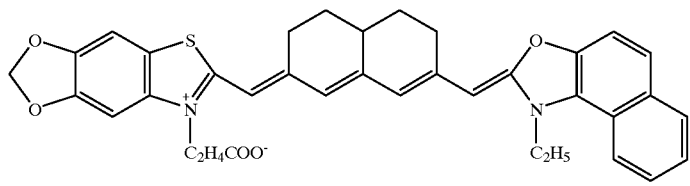
I-37
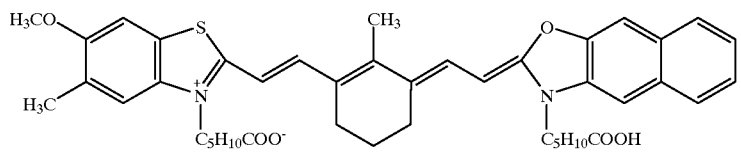
I-38
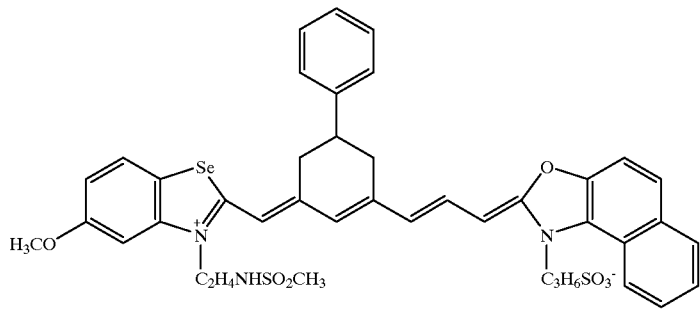
I-39
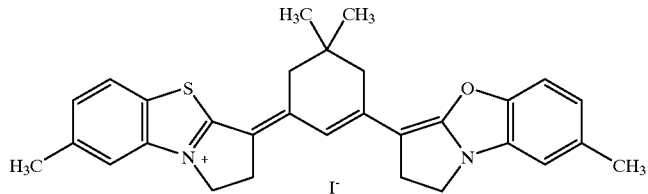
I-40
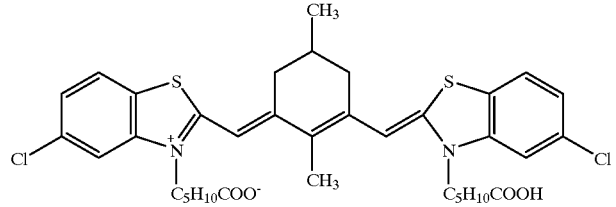
I-41
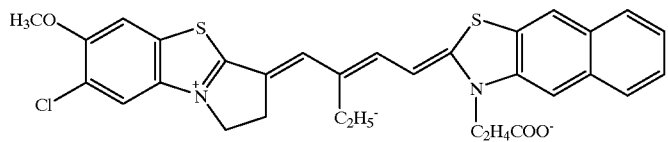

-continued
I-42
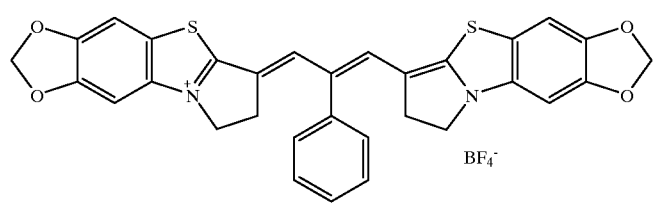
I-43
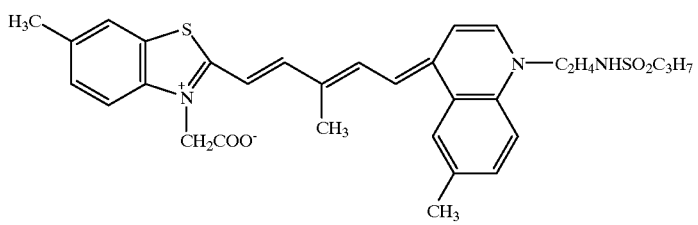
I-44
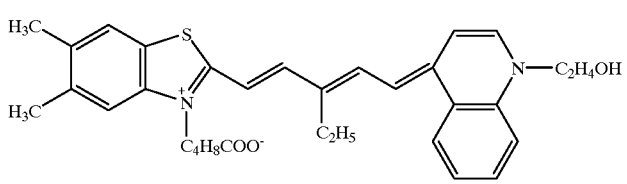
I-45
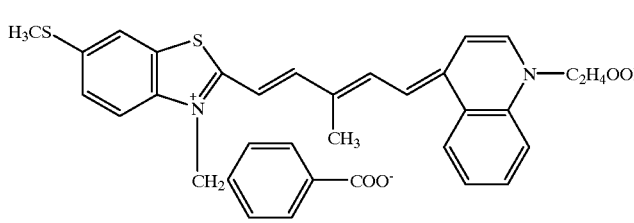
I-46
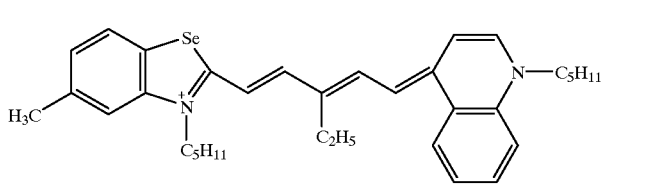
I-47
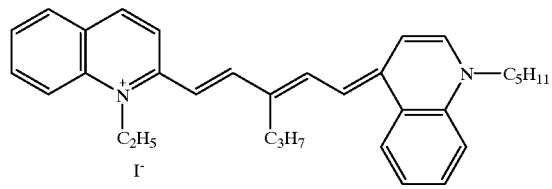
I-48
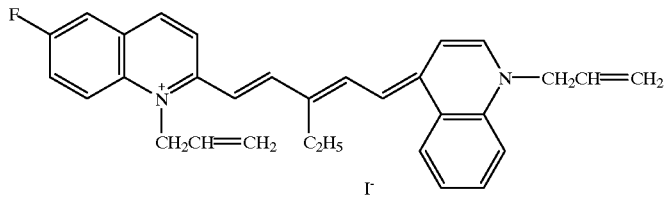

-continued
I-49
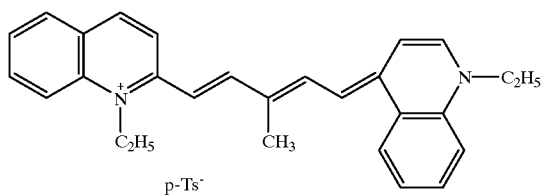
I-50
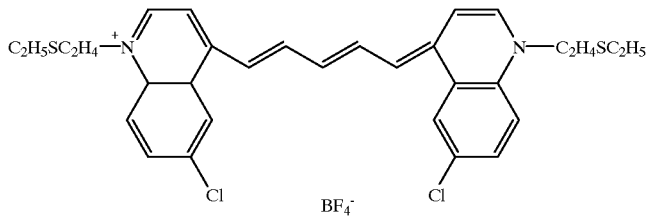
I-51
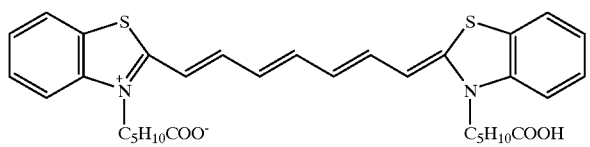
I-52
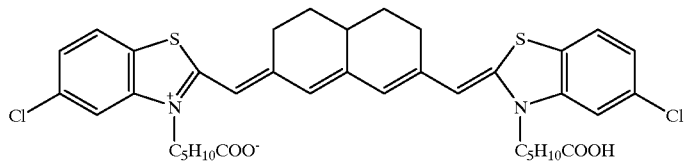
I-53
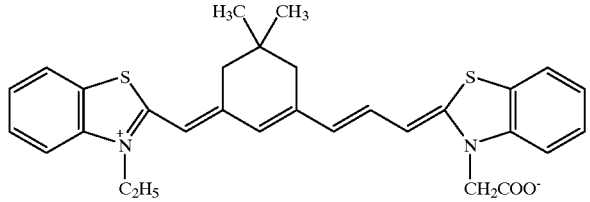
I-54
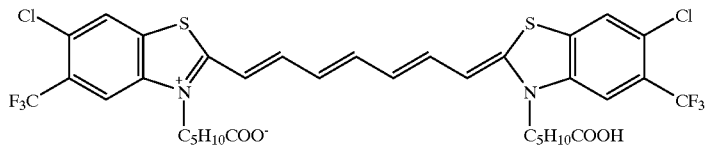
I-55
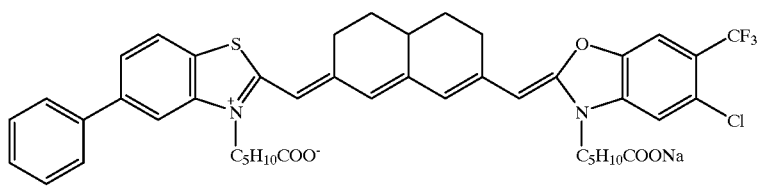
I-56
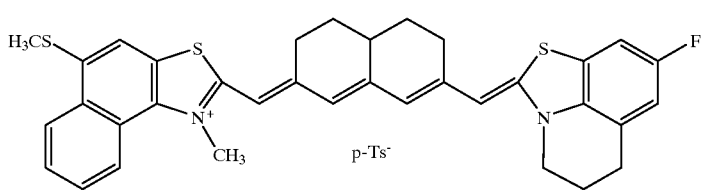

I-57
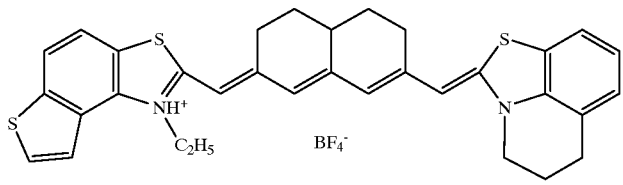

I-58
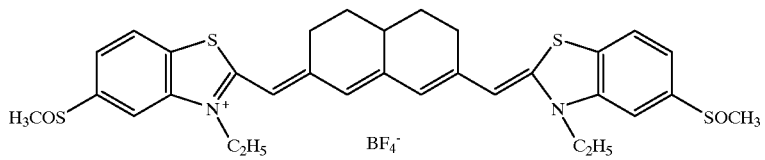

I-59
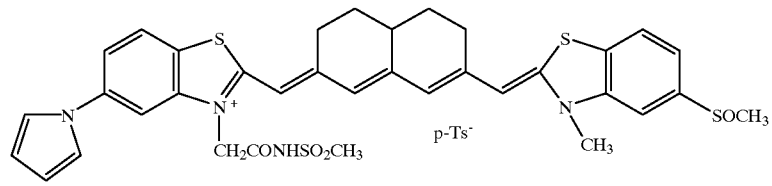

I-60
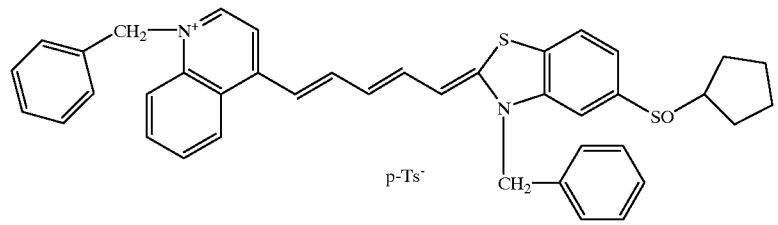

I-61
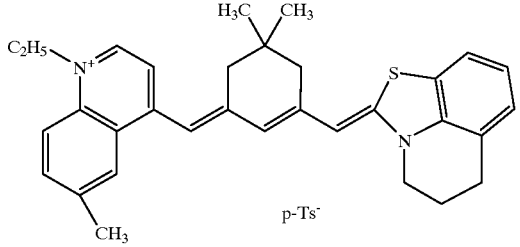

The infrared optical sensitizing dye mentioned above is synthesized in accordance with the method described in, for example, The Chemistry of Heterocyclic Compounds, Vol. 18 by F. M. Harmer, and The Cyanine Dyes and Related Compounds (edited by A. Weissherger, Interscience, New York 1964) can synthesize by practice of mention easily.

Optical sensitizing dye of the present invention may be employed alone, but two or more optical sensitizing dyes are employed in combination together. When two or more optical sensitizing dyes of the present invention are employed in combination together, the optical sensitizing dyes can be dispersed independently or mixedly beforehand in silver halide emulsion by a method mentioned above. For the purpose of supersensitization, a dye having absorption in the visible range, a dye having no optical sensitizing function by itself, or a compound which does not absorb visible light substantially and shows supersensitization may be contained in the emulsion in addition to the optical sensitizing dye of the present invention. Useful optical sensitizing dye, a combination of dyes showing supersensitization and compound showing supersensitization in, are disclosed in, for example, Research Disclosure, 176, 17643, (published in December, 1978), Item J of Page 23 IV, in Japanese Patent Publication Nos. 49-25500, 43-4933, Japanese Patent Open to Public Inspection Nos. 59-19032, 59-192242, 62-123454, and Japanese Patent Open to Public Inspection Nos. 3-15049 and 7-146527.

The added amount of the dye is preferably $1 \times 10^{-4}$ to $1 \times 10^{-3}$ mole per Mole of Ag.

Compound represented by Formula used for the present invention next 2 is described.

Examples of aliphatic group shown by $R_{21}$ and $R_{22}$ in Formula 2 include an alkyl, alkenyl, alkynyl or cycloalkyl group each of which may be straight or branched and have carbon number 1–30, preferably 1–20. Concrete example includes methyl, ethyl, propyl, butyl, hexyl, decyl, dodecyl, isopropyl, t-butyl, 2-ethylhexyl, allyl, 2-butenyl, 7-oxotenyl, propargyl, 2-butynyl, cyclopropyl, cyclopentyl, cyclohexyl, cyclododecyl. Examples of aromatic group shown by $R_{21}$ and $R_{22}$ in Formula 2 include those having carbon number 6–20, and such as phenyl, naphthyl, or anthranil is exemplified concretely. As heterocyclic group represented by $R_{21}$ and $R_{22}$ may be monocyclic ring and condensed ring, example thereof includes 5- or 6-member heterocyclic group containing at least one of O, S and N atom or amineoxide group.

The concrete example includes, pyrrolidine, piperidine, tetrahydrofuran, tetrahydropyran, oxirane, morpholine, thiomorpholine, thiopyran, tetrahydrothiophene, pyrrole, pyridine, furan, thiophene, glyoxaline, pyrazole, oxazole, thiazole, isoxazole, isothiazole, triazole, tetrazole, thiadiazole, oxadiazole and benzelog group derived from these. The ring formed with $R_{21}$ and $R_{22}$ is 4- to 7-member ring, preferably 5 to 7 member-ring. The preferable group for $R_{21}$ and $R_{22}$ is heterocyclic group and aromatic group, and more preferably a heteroaromatic ring group. Aliphatic group, aromatic group or heterocyclic group represented by $R_{21}$ and $R_{22}$ may be substituted by substituent. Example of the substituent includes halogen atom (chlorine atom, bromine atom), alkyl group (methyl group, ethyl group, isopropyl group, hydroxyethyl group, methoxymethyl group, trifluoromethyl group, t-butyl group), cycloalkyl group (cyclopentyl group, cyclohexyl group), aralkyl group (benzyl group, 2-phenethyl group), aryl (phenyl group, naphthyl group, p-tolyl group, p-chlorophenyl group), alkoxy group (methoxy group, ethoxy group, isopropoxy group, butoxy group), aryloxy group (phenoxy group, 4-methoxyphenoxy group), cyano group, acylimino group (acetylamino group, propionylamino group), alkylthio group (methylthio group, ethylthio group, butylthio group), arylthio group (phenylthio group, p-methylphenylthio group), sulfonylamino group (methanesulfonylamino group, benzensulfonylamino group), ureide group (3-methylureide group, 3,3-dimethylureide group, 1,3-dimethylureide group), sulfamoylamino group (dimethylsulfamoylamino group, diethyl sulfamoylamino group), carbamoyl group (methylcarbamoyl group, ethylcarbamoyl group, dimethylcarbamoyl group), sulfamoyl group (ethylsulfamoyl group, dimethylsulfamoyl group), alkoxycarbonyl group (methoxycarbonyl group, ethoxycarbonyl group), aryloxy carbonyl group (phenoxy carbonyl group, p-chlorophenoxycarbonyl group), sulfonyl group (methanesulfonyl group, butane sulfonyl group, phenylsulfonyl group), acyl group (acetyl group, propanoyl group, butyloyl group), amino group (methylamino group, ethylamino group, dimethylamino group), hydroxy group, nitro group, nitroso group, amineoxide group (pyridine-oxide group), imide group (phthalimide group), disulfide group (benzoldisulfide group, benzthiazolyl-2-disulfide group), and heterocyclic group (pyridyl group, benzimidazolyl group, benzthiazolyl group, benzoxazolyl group), carboxyl group, N-oxide group, sulfonic acid group and sulfoxide group. Especially substituent containing electron attractive group is preferable. $R_{21}$ and $R_{22}$ may have one or more substituents of these. And each substituent may be substituted by a substituent mentioned above. Preferable example of the substituent includes carboxy group, N-oxide group and sulfoxide, group, and among these carboxide group and N-oxide group are especially preferable.

"m" is integer of 2–6, preferably 2 or 3.

Concrete example of compound represented by Formula (2) used for the present invention is made.

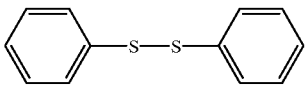

2-1

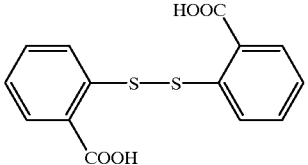

2-2

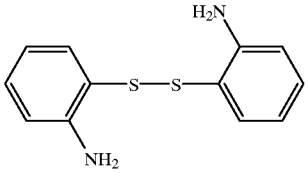

2-3

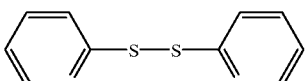

2-4

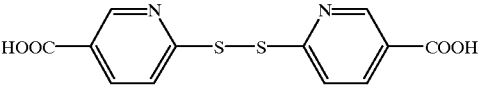

2-5

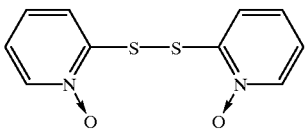

2-6

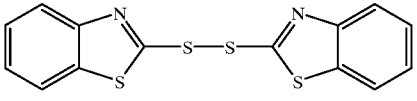

2-7

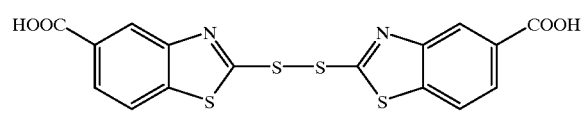

2-8

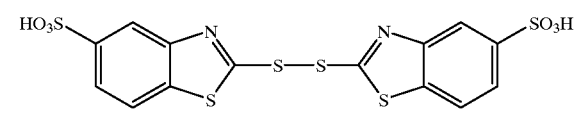

2-9

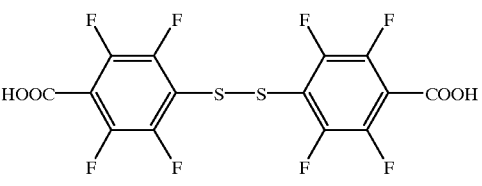

2-10

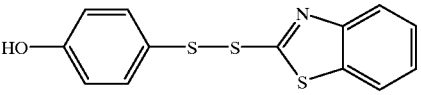

2-11

-continued 2-12
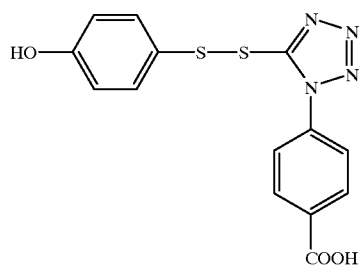

2-13
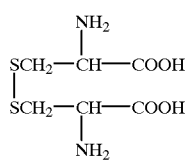

2-14
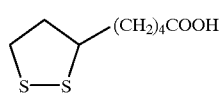

2-15
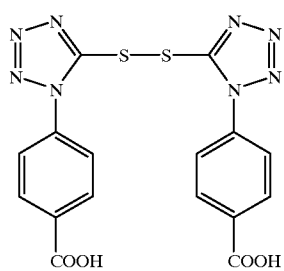

2-16
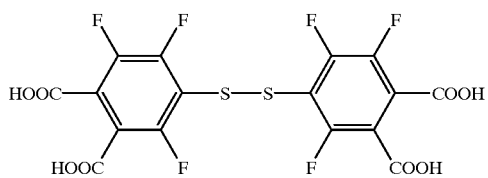

2-17
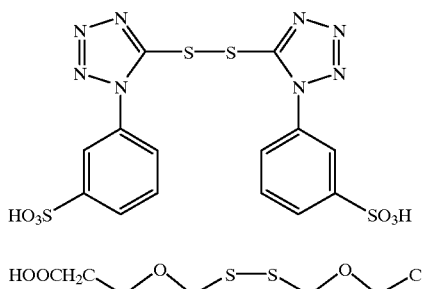

2-18
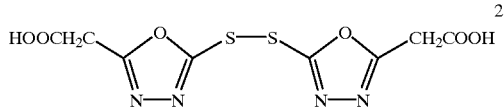

2-19
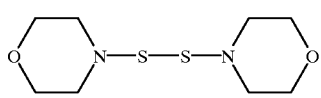

2-20
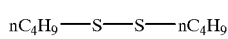

2-21
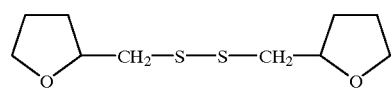

-continued 2-22
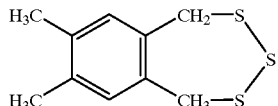

2-23
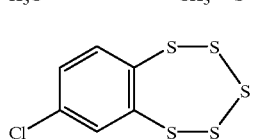

2-24
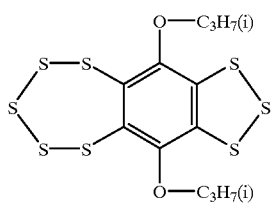

2-25
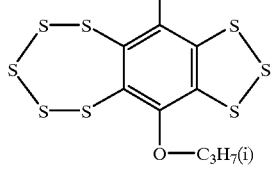

2-26
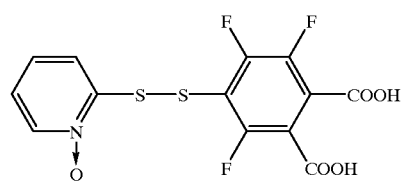

2-27
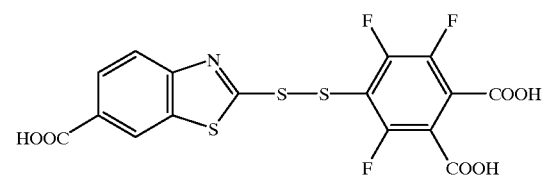

2-28
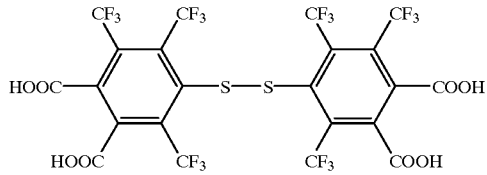

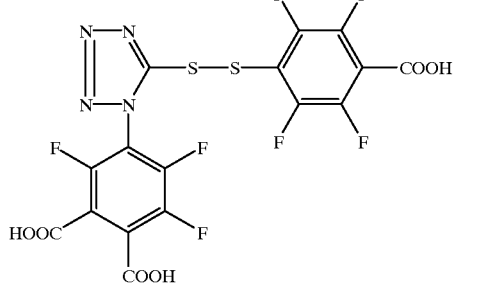

Compounds represented by general formula 2
   (shown in Table 3 as well as amount thereof)
Compounds represented by general formulas 3 to 5
   (shown in Table 3 as well as amount thereof)
Phthalazone (4.5% DMF solution)   8 ml
Developing agent-1 (10% acetone solution)   13 ml
Contrast enhancing agent H
   (1% methanol : DMF = 4 : 1 solution)   2 ml The adding step of the compound represented by Formula 2 is any steps of grain forming, before or after the chemical ripening. The added amount is preferably $1\times10^{-8}$ to 1 mole per Mole of Ag, and is most preferably $10^{-6}$ and 0.3 mole per Ag. Exemplified compounds 2–6 is preferably employed.

Compounds represented by formulas 3 to 5 will now be described.

Compounds represented by formula 3 will be described.

Halogen atoms represented by $X_1$ and $X_2$ may be the same or different, which are a fluorine atom, a chlorine atom, a bromine atom, or an iodine atom. A chlorine atom, a bromine atom, and an iodine atom are preferred; a chlorine atom and a bromine atom are more preferred, while a bromine atom is particularly preferred.

Y represents a divalent bonding group, which is specifically —$SO_2$—, —SO—, —CO—, —N($R_{11}$)—$SO_2$—, —N($R_{11}$)—CO—, —N($R_{11}$)—COO—, —COCO—, —COO—, —OCO—, —OCOO—, —SCO—, —SCOO—, —C($Z_1$)($Z_2$)—, alkylene, arylene, a divalent bonding group formed by a divalent hetero ring or arbitrary combinations thereof. $R_{11}$ represents a hydrogen atom or an alkyl group, and preferably is a hydrogen atom. $Z_1$ and $Z_2$ each represents a hydrogen atom or an electron attractive group, while $Z_1$ and $Z_2$ shall not represent a hydrogen atom at the same time. Those preferred as the electron attractive group are substituents having a Hammett substituent constant σp of not more than 0.01, and more preferred substituents are those having a constant of at least 0.1. Regarding the Hammett substituent constant, Journal of Medicinal Chemistry, 1973, Vol. 16, No. 11, pages 1207 to 1216, etc. can be referred to. Electron attractive groups include, for example, a halogen atom (a fluorine atom (σp value: 0.06), a chlorine atom (σp value: 0.23), a bromine atom (σp value: 0.23), an iodine atom (σp value: 0.18)), a trihalomethyl group (tribromomethyl (σp value: 0.29), trichloromethyl (σp value: 0.33), trifluoromethyl (σp value: 0.54)), a cyano group (σp value: 0.66), a nitro group (σp value: 0.78), an aliphatic aryl or heterocyclic sulfonyl group (for example, methanesulfonyl (σp value: 0.72)), an aliphatic aryl or heterocyclic acyl group (for example, acetyl (σp value: 0.50), benzoyl (σp value: 0.43)), an ethynyl group (σp value: 0.09), an aliphatic aryl or heterocyclic oxycarbonyl group (for example, methoxycarbonyl (σp value: 0.45), phenoxycarbonyl (σp value: 0.45), a carbamoyl group (σp value: 0.36), a sulfamoyl group (σp value: 0.57), etc.

$Z_1$ and $Z_2$ each preferably represents a halogen atom, a cyano group or a nitro group. Of halogen atoms, a chlorine atom, a bromine atom and an iodine atom are preferred, while a chlorine atom and a bromine atom are more preferred, and a bromine atom is particularly preferred.

Y is preferably —$SO_2$—, —SO—, —CO—, and is more preferably —$SO_2$—.

Those, which are preferred as "A", include electron attractive groups and those, which are more preferred, include, for example, a halogen atom (a fluorine atom (σp value: 0.06), a chlorine atom (σp value: 0.23), a bromine atom (σp value: 0.23), an iodine atom (σp value: 0.18)), a trihalomethyl group (tribromomethyl (σp value: 0.29), trichloromethyl (σp value: 0.33), trifluoromethyl (σp value: 0.54)), a cyano group (σp value: 0.66), a nitro group (σp value: 0.78), an aliphatic aryl or heterocyclic sulfonyl group (for example, methanesulfonyl (σp value: 0.72)), an aliphatic aryl or heterocyclic acyl group (for example, acetyl (σp value: 0.50), benzoyl (σp value: 0.43)), an ethynyl group (σp value: 0.09), an aliphatic aryl or heterocyclic oxycarbonyl group (for example, methoxycarbonyl (σp value: 0.45), phenoxycarbonyl (σp value: 0.45), a carbamoyl group (σp value: 0.36), a sulfamoyl group (σp value: 0.57), etc.

Those, which are preferred as "A", include electron attractive groups and those, which are more preferred, include halogen atom, an aliphatic aryl or heterocyclic sulfonyl group, an aliphatic aryl or heterocyclic acyl group, an aliphatic aryl or heterocyclic oxycarbonyl group, and those, which are particularly preferred, include halogen atoms. Of halogen atoms, chlorine atoms, bromine atoms, and iodine atoms are preferred; chlorine atoms and bromine atoms are more preferred, while bromine atoms are particularly preferred.

"n" is preferably 1.

Y3 represents —SO—, —CO—, —N($R_{11}$)—$SO_2$—, —N($R_{11}$)—CO—, —N($R_{11}$)—COO—, —COCO—, —COO—, —OCO—, —OCOO—, —SCO—, —SCOO—, —C($Z_1$)($Z_2$)—, alkylene, arylene, a divalent bonding group formed by a divalent hetero ring or arbitrary combinations thereof.

"A" represents a hydrogen atom, a halogen atom or other electron attractive groups. Those which are preferred as the electron attractive group represented by "A" include substituents having a Hammett substituent constant σp of at least 0.01, and those which are more preferred are substituents having a σp value of not less than 0.1.

The aliphatic groups represented by Q include straight, branched or cyclic alkyl groups (having preferably from 1 to 30 carbon atoms, more preferably from 1 to 20 carbon atoms, and most preferably from 1 to 12 carbon atoms, for example, including methyl, ethyl, iso-propyl, tert-butyl, n-octyl, n-decyl, cyclopropyl, cyclopentyl, cyclohexyl, etc.), an alkenyl group (having preferably from 2 to 30 carbon atoms, more preferably from 2 to 20 carbon atoms, and most preferably from 2 to 12 carbon atoms, and including, for example, vinyl, allyl, 2-butenyl, 3-pentenyl, etc.), an alkynyl group (having preferably from 2 to 30 carbon atoms, more preferably from 2 to 20 carbon atoms, and most preferably from 2 to 12 carbon atoms, and including, for example, propargyl, 3-pentynyl, etc.), and any of these may have a substituent. The substituents include, for example, a carboxyl group, an acyl group, an acylamino group, a sulfonylamino group, a carbamoyl group, a sulfamoyl group, an oxycarbonylacylamino group or a ureido group, etc. The group which is preferred as a aliphatic group represented by Q is an alkyl group, and the more preferred group is a chained alkyl group.

Aromatic groups represented by Q are preferably single ring or double ring aryl groups (for example, phenyl, naphthyl, etc.) having from 6 to 30 carbon atoms, more preferably phenyl groups having from 6 to 20 carbon atoms, and most preferably phenyl groups having from 6 to 12 carbon atoms. The aryl group may have substituents which include, for example, a carboxyl group, an acyl group, an acylamino group, a sulfonylamino group, a carbamoyl group, a sulfamoyl group, an oxycarbonylamino group or a ureido group.

Heterocyclic groups represented by Q include 3- to 10-member saturated or unsaturated hetero rings containing at least one of N, O, or S atom, and these may be a single ring or may form a condensed ring with other rings. Preferred heterocyclic rings include 5- or 6-member aromatic heterocyclic rings, and more preferred rings include 5- or 6-member aromatic heterocyclic group containing a nitrogen atom, and most preferred rings include 5- or 6-member aromatic heterocyclic rings containing 1 or 2 nitrogen atoms. Specific examples of hetero rings include, for example, pyrrolidine, piperidine, piperazine, morpholine, thiophene, furan, pyrrole, imidazole, pyrazole, pyridine, pyrazine, pyridazine, triazole, triazine, indole, indazole, purine, thiadiazole, oxadiazole, quinoline, phthalazine, naphthyridine, quinoxaline, quinazoline, cinnoline, pteridine, acridine, phenanthroline, phenazine, tetrazole, thiazole, oxazole, benzimidazole, benzoxazole, benzthiazole, indolenine, and triazine, quinoline, thiadiazole, benzthiazole, and oxadiazole are more preferred and pyridine, quinoline, thiadiazole, and oxadiazole are particularly preferred.

Q is preferably an aromatic nitrogen-containing heterocyclic group. "m" represents an integer of 3 or 4, and is preferably 3.

Compounds represented by formula 4 will be described.

$X_1$ and $X_2$ and "A" each has the same meaning of $X_1$ and $X_2$ and "A" in the Formula 3 respectively.

Q represents each group of an aromatic hetero 5-member ring having one oxygen atom and 2 or 3 nitrogen atoms, a furan ring, a thiophene ring or a pyrrole ring. Example of the aromatic hetero 5-member ring having one oxygen atom and 2 or 3 nitrogen atoms includes concretely oxadiazole, and oxatriazole. The preferable example is oxadiazole. The preferable example of the ring represented by Q is oxadiazole.

Compounds represented by formula 5 will be described.

$X_1$ and $X_2$ and "A" each has the same meaning of $X_1$ and $X_2$ and "A" in the Formula 3 respectively.

Y represents —SO—, —CO—, —N($R_{11}$)—$SO_2$—, —N($R_{11}$)—CO—, —N($R_{11}$)COO—, —COCO—, —COO—, —OCO—, —OCOO—, —SCO—, —SCOO—, —C($Z_1$)($Z_2$)—, alkylene, arylene, a divalent hetero ring or a divalent linking group formed by arbitrary combinations thereof. $R_{11}$ represents a hydrogen atom or an alkyl group and preferably hydrogen atom. $Z_1$ and $Z_2$ each represents a hydrogen atom or an electron attractive group. $Z_1$ and $Z_2$ shall not represent a hydrogen atom at the same time. Those preferred as the electron attractive group are substituents having a Hammett substituent constant σp of not more than 0.01, and more preferred substituents are those having a constant of at least 0.1. Regarding the Hammett substituent constant, Journal of Medicinal Chemistry, 1973, Vol. 16, No. 11, pages 1207 to 1216, etc. can be referred to. Electron attractive groups include, for example, a halogen atom (a fluorine atom (σp value: 0.06), a chlorine atom (σp value: 0.23), a bromine atom (σp value: 0.23), an iodine atom (σp value: 0.18)), a trihalomethyl group (tribromomethyl (σp value: 0.29), trichloromethyl (σp value: 0.33), trifluoromethyl (σp value: 0.54)), a cyano group (σp value: 0.66), a nitro group (σp value: 0.78), an aliphatic aryl or heterocyclic sulfonyl group (for example, methanesulfonyl (σp value: 0.72)), an aliphatic aryl or heterocyclic acyl group (for example, acetyl (σp value: 0.50), benzoyl (σp value: 0.43)), an ethynyl group (σp value: 0.09), an aliphatic aryl or heterocyclic oxycarbonyl group (for example, methoxycarbonyl (σp value: 0.45), phenoxycarbonyl (σp value: 0.45), a carbamoyl group (σp value: 0.36), a sulfamoyl group (σp value: 0.57), etc.

$Z_1$ and $Z_2$ each preferably represents a halogen atom, a cyano group or a nitro group. Of halogen atoms, a chlorine atom, a bromine atom and an iodine atom are preferred, while a chlorine atom and a bromine atom are more preferred, and a bromine atom is particularly preferred.

Those which are preferred as Y include —SO—, —CO—, —N($R_{11}$)—$SO_2$—, —N($R_{11}$)—CO—, —N($R_{11}$)—COO—, and —C($Z_1$)($Z_2$)—, while those which are more preferred include —SO— and —C($Z_1$)($Z_2$)—. "n" is preferably 1.

Q represents an aliphatic group, an aromatic group, and a heterocyclic group, with proviso that, when Y represents —SO—, Q represents an aromatic 5-member heterocyclic group having at least one hetero atom except for a nitrogen atom. These rings may be condensed with other rings. Specific examples of aromatic 5-member heterocyclic groups include thiazole, oxazole, thiophene, furan, pyrrole, thiadiazole, oxadiazole, thiatriazole, oxatriazole, while those which are preferred as $Q_3$ include a thiadiazole ring, a pyridine ring, and a quinoline ring.

Compounds represented by formula 3 to 5 are exemplified.

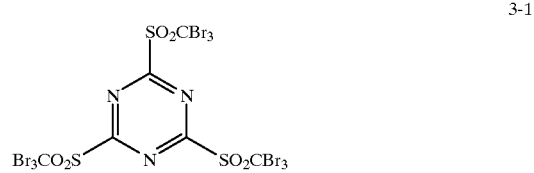

3-1

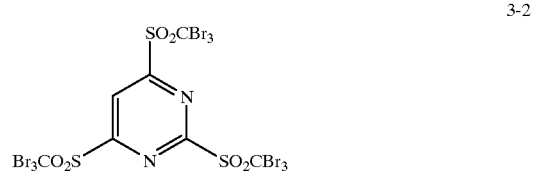

3-2

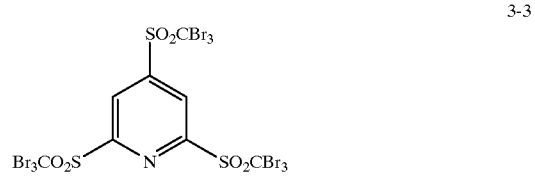

3-3

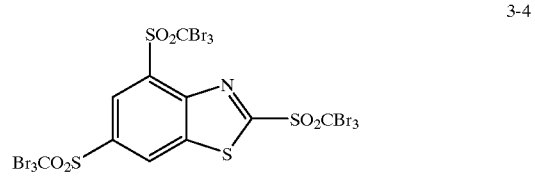

3-4

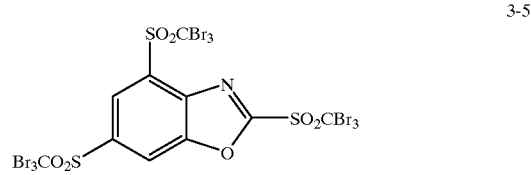

3-5

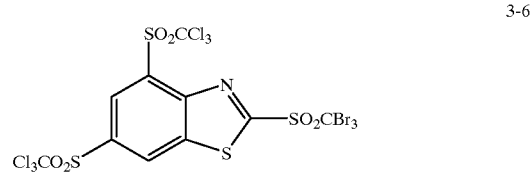

3-6

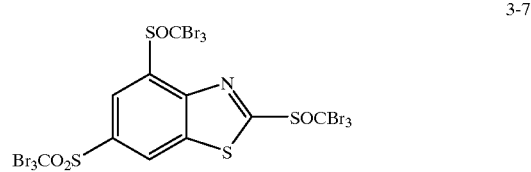

3-7

-continued
3-8 
3-9 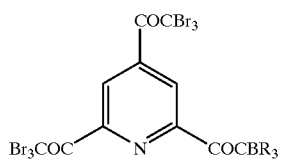
3-10 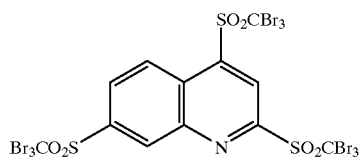
3-11 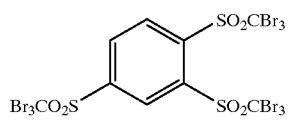
3-12 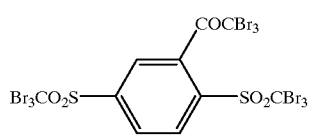
3-13 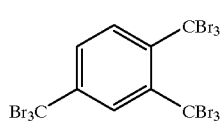
3-14 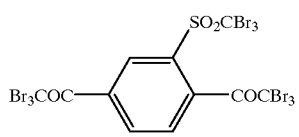
3-15 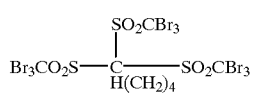
3-16 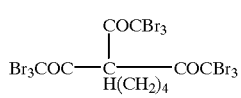
3-17 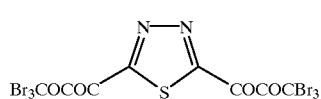
3-18 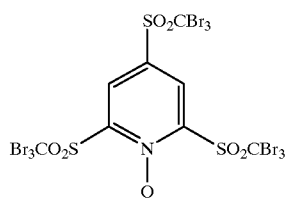
-continued
4-1 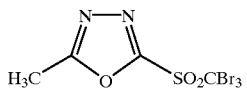
4-2 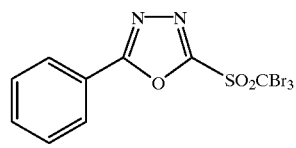
4-3 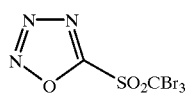
4-4 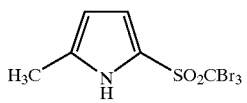
4-5 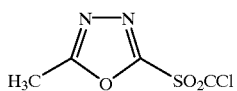
4-6 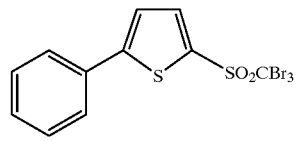
4-7 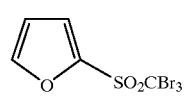
4-8 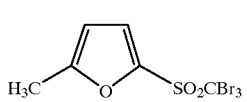
4-9 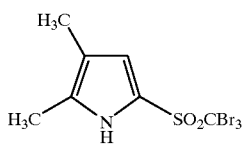
4-10 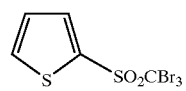
4-11 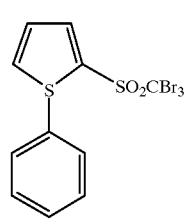

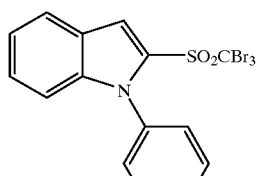
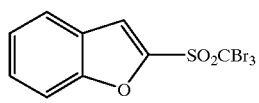
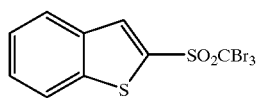
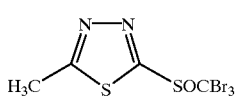
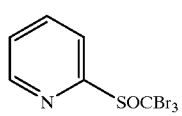
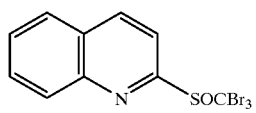
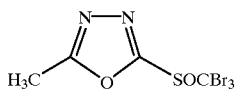
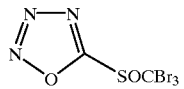
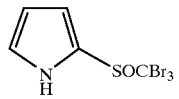
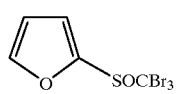
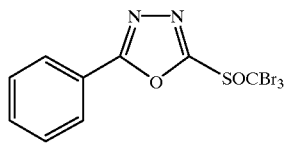
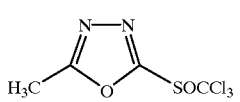
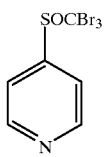
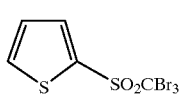
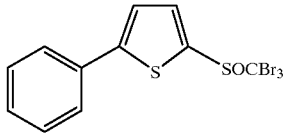
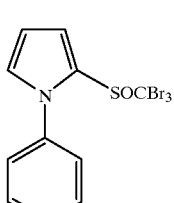
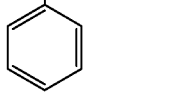
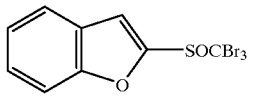
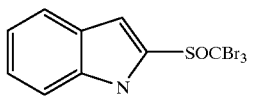
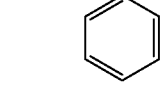
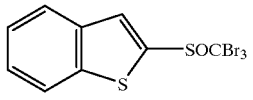
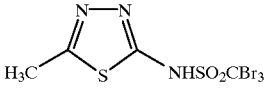
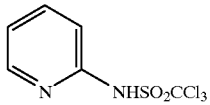
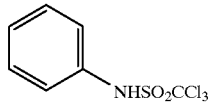

-continued 5-20 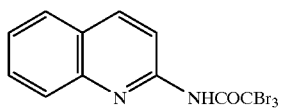

5-21 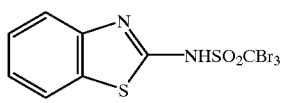

5-22 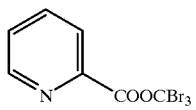

5-23 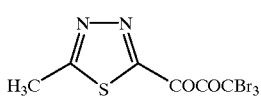

5-24 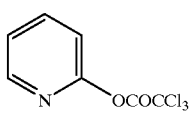

5-25 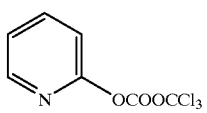

5-26 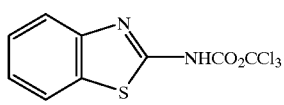

5-27 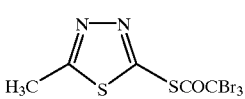

5-28 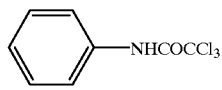

5-29 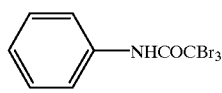

5-30 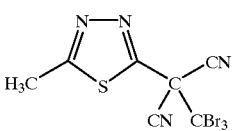

5-31 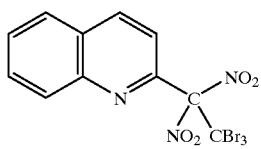

5-32 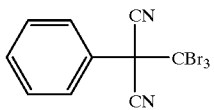

5-33 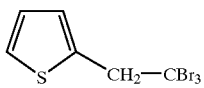

The compound represented by Formulas (3) to (5) of this invention can be synthesized by method disclosed in, for example, Japanese Patent Open to Public Inspection Nos. 54-165,. 6-340611, 7-2781, 7-5621, Japanese Patent Publication No. 7-119953, U.S. Pat. Nos. 5,369,000, 5,374,514, 5,460,938, 5,464,737, and Europe patent 605,981, and 631, 176.

Concrete synthesis examples of the compound represented by Formulas (3) to (5) are shown.

Synthesis example 1. Synthesis of compound 3–1
Synthesis of 2,4,6 tris-carboxy methylthio 1,3,4-triazine Aqueous solution of sodium hydroxide 17.66 g (0.44 mol) in 30 ml of water was added drop by drop to the mixture of 2,4,6-trimercapto-1,3,4-triazine 23.0 g (0.13 mol), chloroacetic acid 54.0 g (0.44 mol) and ethanol 300 ml with stirring at room temperature. After 20 minutes it was heated to 50° C., and aqueous solution of sodium hydroxide 17.6 g (0.44 mol) in 30 ml of water was added drop by drop slowly. It was cooled off to room temperature after 3 hours stirring at 50° C., and then water was added till reaction liquid became uniform, and hydrochloric acid was added for neutralization. Resulted crystal was filtrated and recrystallized in methanol to obtain 2,4,6 tris-carboxymethylthio-1, 3,4-triazine in amount of 35.4 g (0.10 mol). Yield 76%.

Synthesis of 2,4,6 tris-tribromosulfonyl-1,3,4-triazine, (synthesis of compound 3–1)

Bromine in an amount of 31.1 ml was added drop by drop slowly to stirring sodium hydroxide 49.1 g (1.23 mol) in 1 l of water at 0–5° C. Aqueous solution of 2,4,6 tris-carboxymethylthio-1,3,4-triazine 8.2 g (0.023 mol) prepared by the above reaction, sodium hydrogen carbonate 7.2 g (0.0857 mol) in 150 ml of water was added drop by drop slowly further so that reaction temperature did not excess 10° C. After the addition the temperature of the result was raised to room temperature, and it was kept standing single night. Deposition solid was collected by filtration, and washed it with water, Targeted compound 3–1 of white solid was obtained in an amount of 11.3 g (0.011 mol) by recrystallization in ethanol. Yield 48%.

Synthesis example 2. Synthesis of compound 4–7
Synthesis of 2-carboxymethylthiofuran Aqueous solution of sodium hydroxide 8.8 g (0.22 mol) in water of 15 ml was added drop by drop to mixture of 2-mercapto furan 20.0 g (0.20 mol), chloroacetic acid 27.0 g (0.22 mol) and ethanol 300 ml with stirring at room temperature. After 20 minutes of stirring it was heated to 50° C., and further aqueous solution of sodium hydroxide 8.8 g (0.22 mol) in 15 ml of water was added slowly drop by drop. After stirring for 3 hours at 50° C., it was cooled to room temperature, and water was added till reaction liquid became uniform. Hydrochloric acid was added for neutralization. Prepared crystal was collected by filtration and 23.5 g (0.148 mol) of 2-carboxymethylthiofuran was obtained by recrystallization in methanol. Synthesis of yield 74%.

Synthesis of 2-tribromomethylsulfonylfuran (compound 4–7)

Bromine in an amount of 31.1 ml was added drop by drop to stirring sodium hydroxide 49.1 g (1.23 mol) in 1 l of water at 0–5° C., aqueous solution of 2-carboxymethyl thiofuran 11.2 g (0.0706 mol) prepared by the above reaction and sodium hydrogen carbonate 7.2 g (0.0857 mol) in 150 ml of water was added drop by drop slowly further so that reaction temperature did not excess 10° C. After the addition the temperature of the result was raised to room temperature, and it was kept standing single night. Deposition solid was collected by filtration, and washed it with water, Targeted compound 4–7 of white solid was obtained in an amount of 11.5 g (0.0312 mol) by recrystallization in ethanol. Yield 44%.

Synthesis example 3. Synthesis of compound 5–1
Synthesis of 2-carboxymethylthio-5-methyl-1,3,4-thiadiazole Aqueous solution of sodium hydroxide 8.8 g (0.22 mol) in 15 ml of water was added to a mixture of 2-mercapto-5-methyl-1,3,4-thiadiazole 26.4 g (0.20 mol), chloroacetic acid 27.0 g (0.22 mol) and ethanol 300 ml with stirring at room temperature. After 20 minutes of stirring it was heated to 50° C., and further aqueous solution of sodium hydroxide 8.8 g (0.22 mol) in 15 ml of water was added slowly drop by drop. After stirring for 3 hours at 50° C., it was cooled to room temperature, and water was added till reaction liquid became uniform. Hydrochloric acid was added for neutralization. Prepared crystal was collected by filtration and 28.7 g (0.150 mol) of 2-carboxymethylthio-5-methyl-1,3,4-thiadiazole was obtained by recrystallization in methanol. Yield 75%.

Synthesis of 2-tribromomethylsulfo-5-methyl-1,3,4-thiadiazole (compound 5–1)

Bromine in an amount of 31.1 ml was added drop by drop to stirring sodium hydroxide 49.1 g (1.23 mol) in 1 l of water at 0–5° C., aqueous solution of 2-carboxymethylthio-5-methyl-1,3,4-thiadiazole 13.5 g (0.0706 mol) prepared by the above reaction and sodium hydrogen carbonate 7.2 g (0.0857 mol) in 150 ml of water was added drop by drop slowly further so that reaction temperature did not excess 5° C. After the addition the temperature of the result was raised to room temperature, and it was kept standing single night. Deposition solid was collected by filtration, and washed it with water, Targeted compound 5–1 of white solid was obtained in an amount of 13.2 An add amount of compound represented by general formulas (3) to (5) of the present invention is preferably in the range of $10^{-4}$ and 1 mole per Ag, and is most preferably in the range of $10^{-3}$ and 0.3 mole per Ag.

The compounds represented by the formulas 3 to 5 is added in the light sensitive layer or non-light sensitive layer. Preferably it is added in the light sensitive layer.

The compounds are preferably dissolved in an organic solvent and is then added.

Organic silver salts employed in the present invention are reducible silver sources and preferred are organic acids and silver salts of hetero-organic acids having a reducible silver ion source, specifically, long chain (having from 10 to 30 carbon atoms, but preferably from 15 to 25 carbon atoms) aliphatic carboxylic acids and nitrogen-containing heterocyclic rings. Organic or inorganic silver salt complexes are also useful in which the ligand has a total stability constant for silver ion of 4.0 to 10.0. Examples of preferred silver salts are described in Research Disclosure, Items 17029 and 29963, and include the following; organic acid salts (for example, salts of gallic acid, oxalic acid, behenic acid, stearic acid, palmitic acid, lauric acid, etc.); carboxyalkylthiourea salts (for example, 1-(3-carboxypropyl)thiourea, 1-(3-carboxypropyl)-3,3-dimethylthiourea, etc.); silver complexes of polymer reaction products of aldehyde with hydroxy-substituted aromatic carboxylic acid (for example, aldehydes (formaldehyde, acetaldehyde, butylaldehyde, etc.), hydroxy-substituted acids (for example, salicylic acid, benzoic acid, 3,5-dihydroxybenzoic acid, 5,5-thiodisalicylic acid, silver salts or complexes of thions (for example, 3-(2-carboxyethyl)-4-hydroxymethyl-4-(thiazoline-2-thion and 3-carboxymethyl-4-thiazoline-2-thion), complexes of silver with nitrogen acid selected from imidazole, pyrazole, urazole, 1.2,4-thiazole, and 1H-tetrazole, 3-amino-5-benzylthio-1,2,4-triazole and benztriazole or salts thereof; silver salts of saccharin, 5-chlorosalicylaldoxime, etc.; and silver salts of mercaptides The preferred silver salt is silver behenate. The added amount of organic silver salts is preferably less than 3 g/m² in terms of silver amount, and is more preferably less than 2 g/m².

As for a method of preparation of the organic silver salts, which can be obtained by mixing a water soluble silver compound and a compound which forms complex with silver, a normal mixing method, a reverse mixing method, a simultaneous mixing method or a double-jet method described in Japanese Patent Open to Public Inspection No. 9-127643 are preferably employed.

Silver halide grains of photosensitive silver halide in the present invention work as a light sensor. In order to minimize translucence after image formation and to obtain excellent image quality, the less the average grain size, the more preferred, and the average grain size is preferably less than 0.2 μm; is more preferably between 0.03 and 0.15 μm, and is most preferably between 0.03 and 0.11 μm. The average grain size as described herein denotes an average edge length of silver halide grains, when they are so-called regular crystals of cube or octahedron. Furthermore, when grains are not regular crystals, for example, spherical, cylindrical, and tabular grains, the grain size refers to the diameter of a sphere having the same volume as the silver grain.

The silver halide grain shape is preferred, in which a high ratio occupying a Miller index {100} plane is preferred. This ratio is preferably at least 50 percent; is more preferably at least 70 percent, and is most preferably at least 80 percent. The ratio occupying the Miller index {100} plane can be obtained based on T. Tani, J. Imaging Sci., 29, 165 (1985) in which adsorption dependency of a (111) plane and a {100} plane is utilized.

The composition of silver halide may be any of silver chloride, silver chlorobromide, silver chloroiodobromide, silver bromide, silver iodobromide, or silver iodide. The photographic emulsion employed in the present invention can be prepared employing methods described in P. Glafkides, "Chimie et Physique Photographique" (published by Paul Montel Co., 1967), G. F. Duffin, "Photographic Emulsion Chemistry" (published by The Focal Press, 1966), V. L. Zelikman et al., "Making and Coating Photographic Emulsion" (published by The Focal Press, 1964), etc. Namely, any of several acid emulsions, neutral emulsions, ammonia emulsions, and the like may be employed. Furthermore, when grains are prepared by allowing soluble silver salts to react with soluble halide salts, a single-jet method, a double-jet method, or combinations thereof may be employed. The resulting silver halide may be incorporated into an image forming layer utilizing any practical method, and at such time, silver halide is placed adjacent to a reducible silver source. Silver halide may be prepared by converting a part or all of the silver in an organic silver salt formed through the reaction of an organic silver salt with halogen ions into silver halide. Silver halide may be previously prepared and the resulting silver halide may be added to a solution to prepare the organic silver salt, or combinations thereof may be used, however the latter is preferred. Generally, the content of silver halide in organic silver salt is preferably between 0.75 and 30 weight percent.

Silver halide is preferably comprised of ions of metals or complexes thereof, in transition metal belonging to Groups VIB, VIIB, VIII and IB of the Periodic Table. As the above-mentioned metals, preferred are Cr and W (in Group VIB); Re (in Group VIIB); Fe, Co, Ni, Ru, Rh, Pd, Os, Ir, and Pt (in group VIII); and Cu and Au (in Group IB). Of these, when employed for printing plate-making photosensitive materials, it is preferred to use Rh, Re, Ru, Ir, or Os.

These metals may be incorporated into silver halide in the form of complexes. In the present invention, regarding the transition metal complexes, six-coordinate complexes represented by the Formula described below are preferred.

General formula $(ML_6)^m$:

wherein M represents a transition metal selected from elements in Groups VIB, VIIB, VIII, and IB of the Periodic Table; L represents a coordinating ligand; and m represents 0, −1, −2, or −3. Specific examples represented by L include halogens (fluorine, chlorine, bromine, and iodine), cyan, cyanato, thiocyanato, selenocyanato, tellurocyanato, each ligand of azido and aquo, nitrosyl, thionitrosyl, etc., of which aquo, nitrosyl and thionitrosyl are preferred. When the aquo ligand is present, one or two ligands are preferably coordinated. L may be the same or different.

The particularly preferred specific example of M is rhodium (Rh), ruthenium (Ru), rhenium (Re) or osmium (Os).

Specific examples of transition metal ligand complexes are described below.

1: $[RhCl_6]^{3-}$
2: $[RuCl_6]^{3-}$
3: $[ReCl_6]^{3-}$
4: $[RuBr_6]^{3-}$
5: $[OsCl_6]^{3-}$
6: $[CrCl_6]^{4-}$
7: $[Ru(NO)Cl_5]^{2-}$
8: $[RuBr_4(H_2O)]^{2-}$
9: $[Ru(NO)(H_2O)Cl_4]^-$
10: $[RhCl_5(H_2O)]^{2-}$
11: $[Re(NO)Cl_5]^{2-}$
12: $[Re(NO)CN_5]^{2-}$
13: $[Re(NO)ClCN_4]^{2-}$
14: $[Rh(NO)_2Cl_4]^-$
15: $[Rh(NO)(H_2O)Cl_4]^-$
16: $[Ru(NO)CN_5]^{2-}$
17: $[Fe(CN)_6]^{3-}$
18: $[Rh(NS)Cl_5]^{2-}$
19: $[Os(NO)Cl_5]^-$
20: $[Cr(NO)Cl_5]^{2-}$
21: $[Re(NO)Cl_5]^-$
22: $[Os(NS)Cl_4(TeCN)]^{2-}$
23: $[Ru(NS)Cl_5]^{2-}$
24: $[Re(NS)Cl_4(SeCN)]^{2-}$
25: $[Os(NS)Cl(SCN)_4]^{2-}$
26: $[Ir(NO)Cl_5]^{2-}$

One type of these metal ions or complex ions may be employed and the same type of metals or the different type of metals may be employed in combinations of two or more types. Generally, the content of these metal ions or complex ions is suitably between $1\times10^{-9}$ and $1\times10^{-2}$ mole per mole of silver halide, and is preferably between $1\times10^{-8}$ and $1\times10^{-4}$ mole. Compounds, which provide these metal ions or complex ions, are preferably incorporated into silver halide grains through addition during the silver halide grain formation. These may be added during any preparation stage of the silver halide grains, that is, before or after nuclei formation, growth, physical ripening, and chemical ripening. However, these are preferably added at the stage of nuclei formation, growth, and physical ripening; furthermore, are preferably added at the stage of nuclei formation and growth; and are most preferably added at the stage of nuclei formation. These compounds may be added several times by dividing the added amount. Uniform content in the interior of a silver halide grain can be carried out. As described in Japanese Patent Publication Open to Public Inspection No. 63-29603, 2-306236, 3-167545, 4-76534, 6-110146, 5-273683, etc., incorporation can be carried out so as to result preferably in distribution formation in the interior of a grain. These metal compounds can be dissolved in water or a suitable organic solvent (for example, alcohols, ethers, glycols, ketones, esters, amides, etc.) and then added. Furthermore, there are methods in which, for example, an aqueous metal compound powder solution or an aqueous solution in which a metal compound is dissolved along with NaCl and KCl is added to a water-soluble silver salt solution during grain formation or to a water-soluble halide solution; when a silver salt solution and a halide solution are simultaneously added, a metal compound is added as a third solution to form silver halide grains, while simultaneously mixing three solutions; during grain formation, an aqueous solution comprising the necessary amount of a metal compound is placed in a reaction vessel; or during silver halide preparation, dissolution is carried out by the addition of other silver halide grains previously doped with metal ions or complex ions. Specifically, the preferred method is one in which an aqueous metal compound powder solution or an aqueous solution in which a metal compound is dissolved along with NaCl and KCl is added to a water-soluble halide solution. When the addition is carried out onto grain surfaces, an aqueous solution comprising the necessary amount of a metal compound can be placed in a reaction vessel immediately after grain formation, or during physical ripening or at the completion thereof or during chemical ripening.

Reducing agents are preferably incorporated into the thermally developable photosensitive material of the present invention. Examples of suitable reducing agents are described in U.S. Pat. Nos. 3,770,448, 3,773,512, and 3,593,863, and Research Disclosure Items 17029 and 29963, and include the following:

Aminohydroxycycloalkenone compounds (for example, 2-hydroxypiperidino-2-cyclohexane); esters of amino reductones as the precursor of reducing agents (for example, piperidinohexose reducton monoacetate); N-hydroxyurea derivatives (for example, N-p-methylphenyl-N-hydroxyurea); hydrazones of aldehydes or ketones (for example, anthracenealdehydephenylhydrazone); phosphamidophenols; phosphamidoanilines; polyhydroxybenzenes (for example, hydroquinone, t-butylhydroquinone, isopropylhydroquinone, and (2,5-dihydroxy-phenyl) methylsulfone); sulfydroxamic acids (for example, benzenesulfhydroxamic acid); sulfonamidoanilines (for example, 4-(N-methanesulfonamide)aniline); 2-tetrazolylthiohydroquinones (for example, 2-methyl-5-(1-phenyl-5-tetrazolylthio)hydroquinone); tetrahydroquionoxalines (for example, 1,2,3,4-tetrahydroquinoxaline); amidoxines; azines (for example, combinations of aliphatic carboxylic acid arylhydrazides with ascorbic acid); combinations of polyhydroxybenzenes and hydroxylamines, reductones and/or hydrazine; hydroxamic acids; combinations of azines with sulfonamidophenols; α-cyanophenylacetic acid derivatives; combinations of bis-β-naphthol with 1,3-dihydroxybenzene derivatives; 5-pyrazolones, sulfonamidophenol reducing agents, 2-phenylindane-1,3-dione, etc.; chroman; 1,4-dihydropyridines (for example, 2,6-dimethoxy-3,5-dicarboethoxy-1,4-dihydropyridine); bisphenols (for example, bis(2-hydroxy-3-t-butyl-5-methylphenyl)methane, bis(6-hydroxy-m-tri)mesitol, 2,2-bis(4-hydroxy-3-methylphenyl)propane, 4,5-ethylidene-bis(2-t-butyl-6-methyl)phenol, UV-sensitive ascorbic acid derivatives and 3-pyrazolidones.

Binders suitable for the thermally developable photosensitive material to which the present invention is applied are transparent or translucent, and generally colorless. Binders are natural polymers, synthetic resins, and polymers and copolymers, other film forming media; for example, gelatin, gum arabic, poly(vinyl alcohol), hydroxyethyl cellulose, cellulose acetate, cellulose acetatebutylate, poly(vinylpyrrolidone), casein, starch, poly(acrylic acid), poly(methylmethacrylic acid), poly(vinyl chloride), poly(methacrylic acid), copoly(styrene-maleic acid anhydride), copoly(styrene-acrylonitrile, copoly(styrene-butadiene, poly(vinyl acetal) series (for example, poly(vinyl formal)and poly(vinyl butyral), poly(ester) series, poly(urethane) series, phenoxy resins, poly(vinylidene chloride), poly(epoxide) series, poly(carbonate) series, poly(vinyl acetate) series, cellulose esters, poly(amide) series. These may be hydrophilic or hydrophobic.

In the present invention, the amount of the binder in a photosensitive layer is preferably between 1.5 and 6 g/m$^2$, and is more preferably between 1.7 and 5 g/m$^2$. When the amount is below 1.5 g/m$^2$, the density of an unexposed part markedly increases to occasionally cause no commercial viability.

In the present invention, a matting agent is preferably incorporated into the photosensitive layer side. In order to minimize the size variation in repeated use, the matting agent is provided on the surface of a photosensitive material and the matting agent is preferably incorporated in an amount of 0.5 to 10 percent in weight ratio with respect to the total binder in the emulsion layer side.

Materials of the matting agents employed in the present invention may be either organic substances or inorganic substances. Regarding inorganic substances, for example, those can be employed as matting agents, which are silica described in Swiss Patent No. 330,158, etc.; glass powder described in French Patent No. 1,296,995, etc.; and carbonates of alkali earth metals or cadmium, zinc, etc. described in U.K. Patent No. 1.173,181, etc. Regarding organic substances, as organic matting agents those can be employed which are starch described in U.S. Pat. No. 2,322,037, etc.; starch derivatives described in Belgian Patent No. 625,451, U.K. Patent No. 981,198, etc.; polyvinyl alcohols described in Japanese Patent Publication No. 44-3643, etc.; polystyrenes or polymethacrylates described in Swiss Patent No. 330,158, etc.; polyacrylonitriles described in U.S. Pat. No. 3,079,257, etc.; and polycarbonates described in U.S. Pat. No. 3,022,169.

The shape of the matting agent may be crystalline or amorphous. However, a crystalline and spherical shape is preferably employed. The size of a matting agent is expressed in the diameter of a sphere which has the same volume as the matting agent. The particle diameter of the matting agent in the present invention is referred to the diameter of a spherical converted volume.

The matting agent employed in the present invention preferably has an average particle diameter of 0.5 to 10 μm, and more preferably of 1.0 to 8.0 μm. Furthermore, the variation coefficient of the size distribution is preferably not more than 50 percent, is more preferably not more than 40 percent, and is most preferably not more than 30 percent.

The variation coefficient of the size distribution as described herein is a value represented by the formula described below.

Standard deviation of particle diameter)/(average particle diameter)×100

The matting agent according to the present invention can be incorporated into arbitrary construction layers. In order to accomplish the object of the present invention, the matting agent is preferably incorporated into construction layers other than the photosensitive layer, and is more preferably incorporated into the farthest layer from the support surface.

Addition methods of the matting agent according to the present include those in which a matting agent is previously dispersed into a coating composition and is then coated, and prior to the completion of drying, a matting agent is sprayed. When a plurality of matting agents are added, both methods may be employed in combination.

In the present invention, when a thermally developable photosensitive material is specifically employed for the output of a printing image setter with an oscillating wavelength of 600 to 800 nm, hydrazine derivatives are preferably incorporated into a photosensitive material. As hydrazine compounds employed in the present invention, those described below may also be employed.

The compounds described in Research Disclosure, Item 23516 (November 1983 Issue, page 346) and publications cited therein, listed can be those described in U.S. Pat. Nos. 4,080,207, 4,269,929, 4,276,364, 4,278,748, 4,385,108, 4,459,347, 4,478,928, 4,560,638, 4,686,167, 4,912,016, 4,988,604, 4,994,365, 5,041,355, and 5,104,769; U.K. Patent No. 2,011,391B; European Patent Nos. 217310, 301, 799, and 356,898; and Japanese Patent Publication Open to Public Inspection Nos. 60-179734, 61-170733, 61-270744, 62-178246, 62-270948, 63-29751, 63-32538, 63-104047, 63-121838, 63-129337, 63-223744, 63-234244, 63-234245, 63-234246, 63-294552, 63-306438, 64-10233, 1-90439, 1-100530, 1-105941, 1-105943, 1-276128, 1-280747, 1-283548, 1-283549, 1-285940, 2-2541, 2-77057, 2-139538, 2-196234, 2-196235, 2-198440, 2-198441, 2-198442, 2-220042, 2-221953, 2-221954, 2-285342, 2-285343, 2-289843, 2-302750, 2-304550, 3-37642, 3-54549, 3-125134, 3-184039, 3-240036, 3-240037, 3-259240, 3-280038, 3-282536, 4-51143, 4-56842, 4-84134, 2-230233, 4-96053, 4-216544, 5-45761, 5-45762, 5-45763, 5-45764, 5-45765, 6-289524, and 9-160164, etc.

Furthermore, other than those, employed can be compounds described in (Chemical 1) of Japanese Patent Publication No. 6-77138, specifically, compounds described on pages 3 and 4 of the Publication; compounds represented by general formula (I) in Japanese Patent Publication No. 6-93082, specifically, compounds 1 through 38 described on pages 8 to 18 of the Publication; compounds represented by general formula (4), general formula (5), and general formula (6) in Japanese Patent Publication Open to Public Inspection No. 6-230497, specifically, compounds 4–1 through 4–10 on pages 25 and 26, compounds 5–1 through 5–42 on pages 28 to 36, and compounds 6–1 through 6–7 on pages 39 and 40 of the Publication; compounds represented by general formula (I) and general formula (2) in Japanese Patent Publication Open to Public Inspection No. 6-289520, specifically, compounds 1–1) through 1–17) and 2–1) on pages 5 to 7 of the Publication; compounds described in (Chemical 2) and (Chemical 3) of Japanese Patent Publication Open to Public Inspection No. 6-313936, specifically, compounds described on pages 6 to 19 of the Publication; compounds described in (Chemical 1) of Japanese Patent Publication Open to Public Inspection No. 6-313951, specifically, compounds described on pages 3 to 5 of the Publication; compounds represented by general formula (I) in Japanese Patent Publication Open to Public Inspection No. 7-5610, specifically, compounds I-1 through I-38 described on pages 5 to 10 of the Publication; compounds represented by general formula (II) in Japanese Patent Publication Open to Public Inspection No. 7-77783, specifically, compounds II-1 through II-102 described on pages 10 to 27 of the Publication; and compounds represented by general formula (H) and general formula (Ha) in Japanese Patent Publication Open to Public Inspection No. 7-104426, specifically, compounds H-1 through H-44 described on pages 8 to 15 of the Publication.

A hydrazine derivative addition layer is a photosensitive layer and/or a constitution layer adjacent to the photosensitive layer. The added amount is preferably in the range of $10^{-6}$ to $10^{-1}$ mole per mole of silver halide and is most preferably in the range of $10^{-5}$ to $10^{-2}$ mole, though the optimum amount is not defined, depending on the silver halide grain size, halide composition, chemical sensitization degree, reducing agent type, retarder type, etc.

Hydrazine compounds may be dissolved in a suitable organic solvent such as, for example, alcohols (methanol, ethanol, propanol, and fluorinated alcohol), ketones (acetone, methyl ethyl ketone), dimethylformamide, dimethyl sulfoxide, methyl cellosolve, etc. and then employed. Furthermore, employing an emulsification dispersion method which has been well known, hydrazine compounds are dissolved in oils such as dibutyl phthalate, tricresyl phthalate, glyceryl triacetate, diethyl phthalate, etc., and auxiliary solvents such as ethyl acetate, cyclohexane, etc., and can be employed upon mechanically preparing emulsified dispersion. Alternatively, employing a method which has been known as a solid dispersion method, the hydrazine compound powders can be dispersed into water using a ball mill, a colloid mill or supersonic wave and then employed.

In combination with hydrazine compounds, into a photosensitive material, incorporated can be nucleation accelerating agents such as amine derivatives, onium salts, disulfide derivatives, hydroxylamine derivatives, etc.

Thermally developable photosensitive materials are stable at normal temperature, and after exposure, when they are heated to high temperatures (for example, between 80 and 140° C.), they are developed. Upon heating them, silver is formed through an oxidation-reduction reaction of an organic silver salt (working as an oxidizing agent) with a reducing agent. This oxidation-reduction reaction is accelerated with a catalytic action of a latent image formed in photosensitive silver halide by exposure. Silver formed by the reaction of an organic silver salt in an exposed area provides a black image. This is in contrast to the unexposed area, and thereby forms an image. This reaction process proceeds without providing a processing solution such as water from the outside.

The thermally developable photosensitive material comprises a support having thereon at least one photosensitive layer, and the photosensitive layer may only be formed on the support. Further, at least one nonphotosensitive layer is preferably formed on the photosensitive layer. In order to control the amount or wavelength distribution of light transmitted through the photosensitive layer, a filter layer may be provided on the same side as the photosensitive layer, or on the opposite side. Dyes or pigments may also be incorporated into the photosensitive layer. As the dyes, preferred are compounds described in Japanese Patent Publication Open to Public Inspection No. 8-201959. The photosensitive layer may be composed of a plurality of layers. Furthermore, for gradation adjustment, in terms of sensitivity, layers may be constituted in such a manner as a fast layer/slow layer or a slow layer/fast layer. Various types of additives may be incorporated into any of a photosensitive layer, a nonphotosensitive layer, or other formed layers. In the thermally developable photosensitive material, employed may be, for example, surface active agents, antioxidants, plasticizers, UV absorbers, covering aids, etc.

Image color control agents are preferably incorporated into the thermally developable photosensitive material of the present invention. Examples of suitable image color control agents are disclosed in Research Disclosure Item 17029, and include the following:

imides (for example, phthalimide), cyclic imides, pyrazoline-5-ons, and quinazolinon (for example, succinimide, 3-phenyl-2-pyrazoline-5-on, 1-phenylurazole, quinazoline and 2,4-thiazolidin); naphthalimides (for example, N-hydroxy-1,8-naphthalimide); cobalt complexes (for example, cobalt hexaminetrifluoroacetate), mercaptans (for example, 3-mercapto-1,2,4-triazole); N-(aminomethyl) aryldicarboxyimides (for example, N-(dimethylaminomethyl)phthalimide); blocked pyrazoles, isothiuronium derivatives and combinations of certain types of light-bleaching agents (for example, combination of N,N'-hexamethylene(1-carbamoyl-3,5-dimethylpyrazole), 1,8-(3,6-dioxaoctane)bis(isothiuroniumtrifluoroacetate), and 2-(tribromomethylsulfonyl)benzothiazole; merocyanine dyes (for example, 3-ethyl-5-((3-etyl-2-benzothiazolinylidene(benzothiazolinylidene))-1-methylethylidene-2-thio-2,4-oxazolidinedione); phthalazinone, phthalazinone derivatives or metal salts thereof (for example, 4-(1-naphthyl)phthalazinone, 6-chlorophthalazinone, 5,7-dimethylphthalazinone, and 2,3-dihydro-1,4-phthalazinedione); combinations of phthalazinone and sulfinic acid derivatives (for example, combination of 6-chlorophthalazinone and benzenesulfinic acid sodium or combination of 8-methylphthalazinone and p-trisulfonic acid sodium); combinations of phthalazine and phthalic acid; combinations of phthalazine (including phthalazine addition products) with at least one compound selected from maleic acid anhydride, and phthalic acid, 2,3-naphthalenedicarboxylic acid or o-phenylenic acid derivatives and anhydrides thereof (for example, phthalic acid, 4-methylphthalic acid, 4-nitrophthalic acid, and tetrachlorophthalic acid anhydride); quinazolinediones, benzoxazine, nartoxazine derivatives, benzoxazine-2,4-diones (for example, 1,3-benzoxazine-2,4-dione); pyrimidines and asymmetry-triazines (for example, 2,4-dihydroxypyrimidine), and tetraazapentalene derivatives (for example, 3,6-dimercapto-1,4-diphenyl-1H,4H-2,3a,5,6a-tatraazapentalene). Preferred image color control agents include phthalazone or phthalazine.

In the thermally developable photosensitive material of the present invention, employed can be sensitizing dyes described, for example, in Japanese Patent Publication Open to Public Inspection Nos. 63-159841, 60-140335, 63-231437, 63-259651, 63-304242, and 63-15245; U.S. Pat. Nos. 4,639,414, 4,740,455, 4,741,966, 4,751,175, and 4,835,096. Useful sensitizing dyes employed in the present invention are described, for example, in publications described in or cited in Research Disclosure Items 17643, Section IV-A (page 23, December 1978), 1831, Section X (page 437, August 1978). Particularly, selected can advantageously be sensitizing dyes having the spectral sensitivity suitable for spectral characteristics of light sources of various types of scanners. For example, dyes are preferably selected from: A) for an argon laser, simple merocyanines described in Japanese Patent Publication Open to Public Inspection Nos. 60-162257 and 2-48653; U.S. Pat. No. 2,161,331; West Germany Patent No. 930,071; and Japanese Patent Publication Open to Public Inspection No. 5-11389; B) for helium-neon laser, tri-nucleus cyanine dyes illustrated in Japanese Patent Publication Open to Public Inspection Nos. 50-62425, 54-18726, and 59-102229, and merocyanines illustrated in Japanese Patent Publication Open to Public Inspection 7-287338; C) for a LED light source and a red semiconductor laser, thiacarbocyanine described in Japanese Patent Publications Nos. 48-42172, 51-9609, 55-39818; and Japanese Patent Publication Open to Public Inspection Nos. 62-284343 and 2-105135; D) for an infrared semiconductor laser light source, tricarbocyanines described in Japanese Patent Publication Open to Public Inspection Nos. 59-191032 and 60-80841, and dicarbocyanines containing a 4-quinoline nucleus described in general formulas (IIIa) and (IIIb) in Japanese Patent Publication Open to Public Inspection Nos. 59-192242 and 3-67242. These sensitizing dyes may be individually or in combinations thereof. The combinations of sensitizing dyes are frequently for the purpose of supersensitization. The compounds which exhibit no spectral sensitizing action or substantially absorb no visible light and exhibit supersensitization may be incorporated into an emulsion.

Exposure to the thermally developable photosensitive material of the present invention is preferably carried out using an Ar laser (488 nm), a He-Ne laser (633 nm), a red color semiconductor laser (670 nm), an infrared semiconductor laser (780 nm and 830 nm), etc.

EXAMPLES

The present invention is detailed with reference to Examples below.

Example 1
Preparation of Silver Halide Grain A

In 900 ml of deionized water, 7.5 g of gelatin and 10 mg of potassium bromide was dissolved. After regulating the temperature to 35° C. and adjusting the pH to 3.0, 370 ml of an aqueous solution containing 74 g of silver nitrate and an aqueous solution containing potassium bromide and potassium iodide in a mole ratio of 96 to 4 were added over 10 minutes using a controlled double-jet method. After that, 0.3 g of 4-hydroxy-6-methyl-1,3,3a,7-tetraazaindene was added and the pH was adjusted to 5 using NaOH. Thus, obtained was cubic silver iodobromide grains having an average grain size of 0.06 μm, a variation coefficient of the projection diameter area of 8 percent, and a {100} plane ratio of 86 percent. The resulting emulsion was flocculated employing a flocculating agent and after desalting, 0.1 g of phenoxyethanol was added and the pH and pAg were adjusted to 5.9 and 7.5, respectively and the emulsion A was obtained.

Emulsion of the Invention Em-1
To the Emulsion A prepared above, 4 mg of compound 2–6 of the Formula 2 was added. Then, the temperature was elevated to 60° C.; 2 mg of sodium thiosulfate were added, and after ripening for 100 minutes, the resulting emulsion was cooled to 38° C. to complete the chemical ripening to obtain emulsion of the Invention Em-1.

Emulsion for comparative Em-2
For the Emulsion A prepared above, the temperature was elevated to 60° C.; 2 mg of sodium thiosulfate were added, and after ripening for 100 minutes, the resulting emulsion was cooled to 38° C. to complete the chemical ripening to obtain emulsion of the Invention Em-2.

Preparation of Organic Fatty Acid Silver Emulsions Em-1a and Em-2a

To 300 ml of water, 10.6 g of behenic acid was added, and the resulting mixture was heated to 90° C., and the behenic acid was dissolved. Then, 31.1 ml of 1N sodium hydroxide was added with well stirring; the resulting mixture was left standing for one hour as it was. Then, it was cooled to 30° C., and was added with 7.0 ml of 1N phosphoric acid; was added with 0.01 g of N-bromosuccinic acid while stirring well. Thereafter, emulsion of the Invention Em-1 and emulsion for comparative Em-2 (silver halide grains) previously prepared were receptively added with stirring while heating to 40° C. so as to make 10 mole percent in respect to behenic acid in terms of silver amount. Furthermore, 25 ml of a 1N aqueous silver nitrate solution was continuously added over 2 minutes and the resulting mixture was kept standing for one hour while stirring. To the resulting emulsion, polyvinyl butyral dissolved in ethyl acetate was added and after stirring well, was left standing to form an ethyl acetate phase containing silver behenate grains and silver halide grains and a water phase. After removing the water phase, silver behenate grains and silver halide grains were collected employing centrifugal separation. After that, 20 g of synthesized Zeolite A-3 (spherical) manufactured by Tosoh Corp. and 22 cc of isopropyl alcohol were added and the resulting mixture was kept standing for one hour and was filtered. Further, 3.4 g of polyvinyl butyral and 23 cc of isopropyl alcohol were added and the resulting mixture was subjected to high speed agitation and dispersion to complete the preparation of an organic fatty acid silver emulsions Em-1a and Em-2a.

Composition of Photosensitive Layer
A photosensitive layer coating composition was prepared as described below.

| | |
|---|---|
| Organic fatty acid silver emulsion (Em-1a or Em-2a) | 1.75 (in silver)/m$^2$ |
| Pyridiniumhydrobromidperbromide | $1.5 \times 10^{-4}$ mole/m$^2$ |
| Calcium bromide | $1.8 \times 10^{-4}$ mole/m$^2$ |
| 2-(4-chlorobenzoyl)benzoic acid | $1.5 \times 10^{-3}$ mole/m$^2$ |
| Sensitizing dye (shown in Table 1 as well as amount thereof) | |
| Compound of Formula 2 (shown in Table 1 as well as amount thereof) | |
| Developer-1 (10% acetone solution) | 13 ml |
| 2-Mercaptobenzimidazole | $3.2 \times 10^{-3}$ mole/m$^2$ |

As solvents, methyl ethyl ketone, acetone, and methanol were suitably employed.

Composition of Surface Protective Layer
A surface protective layer coating composition was prepared as described below.

| | |
|---|---|
| Cellulose acetate | 4 g/m$^2$ |
| 1,1-bis(2-hydroxy-3,5-dimethyl-phenyl-3,5,5-trimethyl hexane | $4.8 \times 10^{-3}$ mole/m$^2$ |
| Phthalazine | $3.2 \times 10^{-3}$ mole/m$^2$ |
| 4-Methylphthalic acid | $1.6 \times 10^{-3}$ mole/m$^2$ |
| Tetrachlorophthalic acid | $7.9 \times 10^{-4}$ mole/m$^2$ |

-continued

| | |
|---|---|
| Tetrachlorophthalic acid anhydride | $9.1 \times 10^{-4}$ mole/m² |
| Compound of Formula 2 (shown in Table 1 as well as amount thereof) | |
| Silicon dioxide (particle diameter of 2 μm) | 0.22 g/m² |

As solvents, water, methyl ethyl ketone, acetone, and methanol were suitably employed.

Composition of Backing Layer

A backing layer coating composition was prepared as described below.

| | |
|---|---|
| Cellulose acetate | 4 g/m² |
| Antihalation dyes | |
| Dye D-2 | 0.06 g/m² |
| Dye D-3 | 0.018 g/m² |
| Polymethyl methacrylate (particle diameter of 10 μm) | 0.02 g/m² |

Developing agent-1

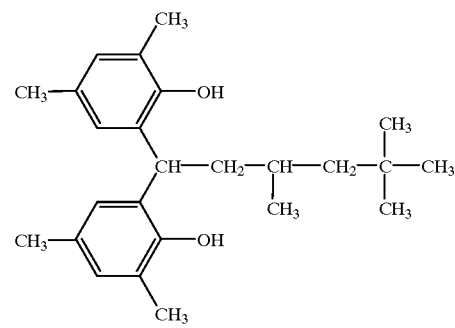

Dye D-2

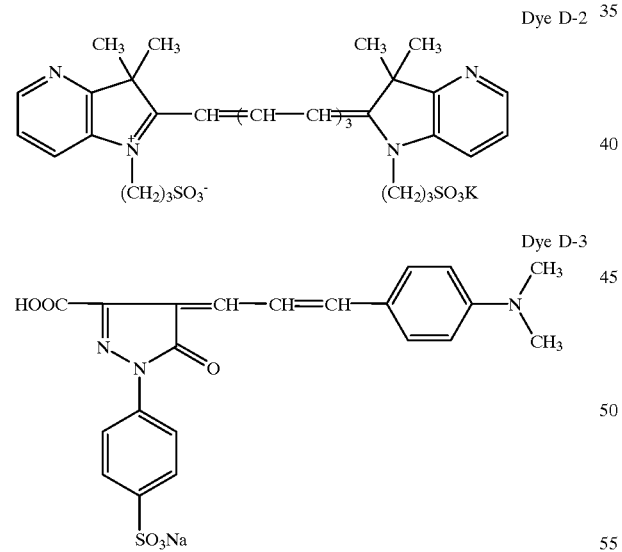

Dye D-3

Onto a 175 μm thick biaxially stretched polyethylene terephthalate film, coating solutions as described above were coated and dried to obtain thermally developable photosensitive material samples 1 to 8.

Sensitometric Evaluation

The thermally developable photosensitive material as prepared above was cut into a half size and was subjected to exposure using a beam from a 830 nm laser diode declined from the vertical plane by 13°. Thereafter, the exposed sample was subjected to thermal processing at 120° C. for 15 seconds employing a heating drum. At that time, the fog value was measured and sensitivity (the reciprocal of the ratio of an exposure amount to give density greater than 1.0 above fog) was also measured. When the sensitivity of Sample No. 1 was 100, the sensitivity of each sample was expressed in the ratio and evaluated. Table 2 shows the results.

Evaluation on Pre-exposure Storage Stability

In the inside of a tightly sealed vessel, which was maintained at 25° C. and RH 55 percent, three coating samples were placed and were kept at 50° C. for 7 days (accelerated aging). The second sample of these and stored sample (stored in a light-shielded vessel at room temperature) were subjected to the same processing as that employed for sensitometry and the density of fog portion was measured. Tale 2 shows the results.

(Fog increase 1)=(fog at accelerated aging)−(fog at comparative aging)

Evaluation on Image Lasting Quality

One of the two Samples which had been subjected to the same processing as those for the sensitometric evaluation was stored at 25° C. and RH 55% under shielded light for 7 days and the other was exposed to natural light at 25° C. and RH 55% for 7 days. The density of a fog portion of each Sample was measured. Table 2 shows the results.

(Fog increase 2)=(fog due to exposure to natural light)−(fog under shielded light)

TABLE 1

| | Photosensitive Layer | | | Surface Protective Layer | |
|---|---|---|---|---|---|
| Sample No. | Organic Fatty Acid Silver Emulsion | Optical sensitizing dye (mol/Ag mol) | Compound of Formula 2 (mmol/Ag mol) | Compound of Formula 2 mmol/Ag mol | Remarks |
| 1 | Em-2a | Comparative dye A 0.02 | — | Comparative 1 4 | Comp. |
| 2 | Em-2a | I-51 0.02 | Comparative 1 4 | — | Comp. |
| 3 | Em-1a | I-31 0.02 | 2-6 1 | — | Inv. |
| 4 | Em-1a | I-21 0.02 | 2-25 1 | — | Inv. |
| 5 | Em-1a | I-32 I-51 0.01 0.01 | 2-5 2 | — | Inv. |
| 6 | Em-1a | I-9 I-54 0.02 0.002 | 2-16 2 | 2-16 2 | Inv. |
| 7 | Em-1a | I-53 0.02 | — | 2-28 4 | Inv. |
| 8 | Em-1a | I-17 0.02 | 2-15 2-27 2 2 | — | Inv. |

Comparative retardant

Comparative 1

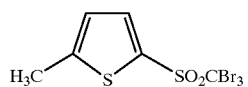

Comparative dye A

TABLE 1-continued

Photosensitive Layer

| Sample No. | Organic Fatty Acid Silver Emulsion | Optical sensitizing dye (mol/Ag mol) | Compound of Formula 2 (mmol/Ag mol) | Surface Protective Layer Compound of Formula 2 mmol/Ag mol | Remarks |
|---|---|---|---|---|---|

$$CH_3\underset{\underset{(CH_2)_5COO^-}{N^+}}{\overset{S}{\underset{\phantom{|}}{\bigcirc}}}{-}CH{=}CH{-}\underset{CH_3}{\overset{CH_3}{C}}{=}CH{-}CH{=}\underset{N}{\bigcirc}\underset{\phantom{|}}{\overset{CH_3}{\bigcirc}}$$

TABLE 2

| Sample No. | Fog | Sensitivity | Dmax | Pre-exposure Storage Stability | Image Lasting Quality | Remarks |
|---|---|---|---|---|---|---|
| 1 | 100 | 100 | 100 | 100 | 100 | Comp. |
| 2 | 96 | 89 | 100 | 99 | 95 | Comp. |
| 3 | 79 | 110 | 119 | 39 | 40 | Inv. |
| 4 | 73 | 117 | 119 | 33 | 34 | Inv. |
| 5 | 74 | 117 | 120 | 36 | 37 | Inv. |
| 6 | 70 | 120 | 121 | 31 | 33 | Inv. |
| 7 | 89 | 116 | 120 | 51 | 48 | Inv. |
| 8 | 75 | 115 | 120 | 36 | 35 | Inv. |

Based on Table 2, it can be seen that Samples of the present invention exhibit ample sensitivity and minimum fog, and excellent pre-exposure storage stability of the photosensitive material as well as excellent image lasting quality.

Example 2

Preparation of a Subbed Photographic Support

Preparation of a Subbed PET Photographic Support

Both surfaces of a biaxially stretched thermally fixed 100 μm PET film, available on the market, was subjected to corona discharging at 8 w/m²·minute. Onto the surface of one side, the subbing coating composition a-1 descried below was applied so as to form a dried layer thickness of 0.8 μm, which was then dried. The resulting coating was designated Subbing Layer A-1. Onto the opposite surface, the subbing coating composition b-1 described below was applied to form a dried layer thickness of 0.8 μm. The resulting coating was designated Subbing Layer B-1.

<Subbing Coating Composition a-1>

| | |
|---|---|
| Latex liquid (with a solid portion of 30%) of a copolymer consisting of Butyl acrylate (30 weight %) t-butyl acrylate (20 weight %) 2-Hydroxyethyl acrylate (25 weight %) | 270 g |
| (C-1) | 0.6 g |
| Hexamethylene-1,6-bis(ethyleneurea) | 0.8 g |
| Water to make | 1 liter |

<Subbing Coating Composition b-1>

| | |
|---|---|
| Latex liquid (solid portion of 30%) of a copolymer consisting of butyl acrylate (40 weight %) styrene (20 weight %) glycidyl acrylate (25 weight %) | 270 g |
| (C-1) | 0.6 g |
| Hexamethylene-1,6-bis(ethyleneurea) | 0.8 g |
| Water to make | 1 liter |

Subsequently, the surfaces of Subbing Layers A-1 and B-1 were subjected to corona discharging with 8 w/m²·minute. Onto the Subbing Layer A-1, the upper subbing layer coating composition a-2 described below was applied so as to form a dried layer thickness of 0.8 μm, which was designated Subbing Layer A-2, while onto the Subbing Layer B-1, the upper subbing layer coating composition b-2 was applied so at to form a dried layer thickness of 0.8 μm, having a static preventing function, which was designated Subbing Upper Layer B-2.

<Upper Subbing Layer Coating Composition a-2>

| | |
|---|---|
| Gelatin | amount to make 0.4 g/m² |
| (C-1) | 0.2 g |
| (C-2) | 0.2 g |
| (C-3) | 0.1 g |
| Silica particles (average diameter of 3 μm) | 0.1 g |
| Water to make | 1 liter |

<Upper Subbing Layer Coating Composition b-2>

| | |
|---|---|
| (C-4) | 60 g |
| Latex liquid (solid portion of 20%) comprising (C-5) as a substituent | 80 g |
| Ammonium sulfate | 0.5 g |
| (C-6) | 12 g |
| Polyethylene glycol (average molecular weight of 600) | 6 g |
| Water to make | 1 liter |

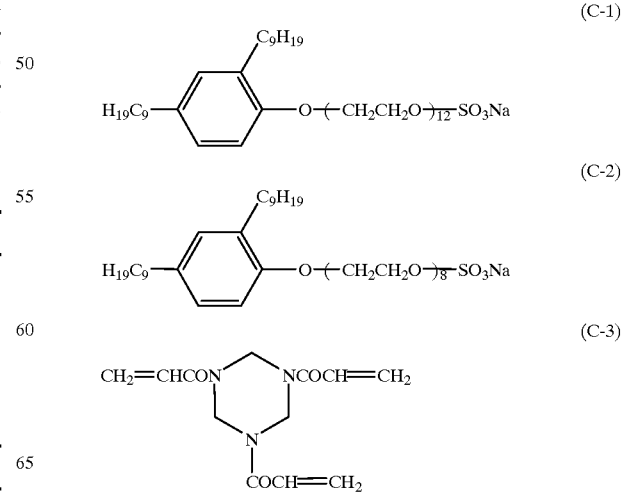

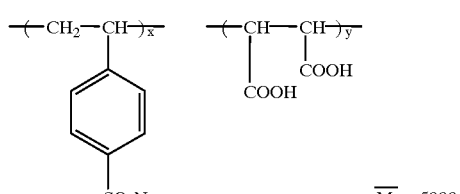

(C-4)

($\overline{M_n}$ is number average molecular weight)
x : y = 75 : 25 (weight ratio)

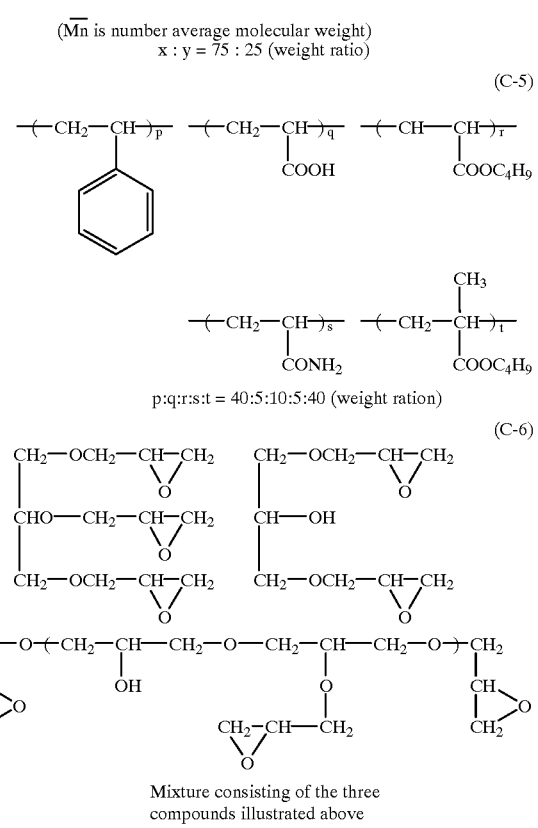

Mixture consisting of the three
compounds illustrated above

Preparation of Emulsion B

In 900 ml of water, 7.5 g of inert gelatin and 10 mg of potassium bromide were dissolved. After adjusting the temperature to 35° C. and the pH to 3.0, 370 ml of an aqueous solution containing 74 g of silver nitrate, an aqueous solution containing potassium bromide and potassium iodide in a mole ratio of 98/2, and $1 \times 10^{-4}$ mole of rhodium chloride salt per mole of silver were added over 10 minutes employing a controlled double-jet method while maintaining the pAg at 7.7. After that, 0.3 g 4-hydroxy-6-methyl-1,3,3a,7-tetraazaindene was added and the pH was adjusted to 5, using NaOH. Thus, obtained were cubic silver iodobromide grains having an average grain size of 0.06 μm, a projection diameter area variation coefficient of 8 percent, and a {100} plane ratio of 87 percent. The resulting emulsion was subjected to desalting through flocculation precipitation, employing a flocculaing agent. After that, 0.1 g of phenoxyethanol was added, and the pH and pAg were adjusted to 5.9 and 7.5, respectively, to obtain a silver halide emulsion.

Preparation of Emulsion Em-3 of the Invention

Subsequently predetermined amount of the emulsion prepared above was divide. Then, the temperature was made to 55° C.; 4 mg of Compound 2–6 of the Formula 2 was added. After that, 10 mg of sodium thiosulfate, 2 mg of triphenylphosphinselenide, solid fine particle dispersion were added, and, 105 mg of ammonium thiocyanate and 12.5 mg of chloroauric acid were added. Further 0.2 mol % of fine particles of silver iodide were added. The emulsion was ripened for 2 hours as a whole. At the completion of ripening 5 mg of 1-phenyl-5-mercaptotetrazole (PMT) and Compound 2–16 of the Formula 2 were added. The added amount is shown per 1 mol of silver halide.

Preparation of Emulsion Em-4 for Comparative

Predetermined amount of the emulsion prepared above was deviled. Then, the temperature was made to 55° C. After that, 10 mg of sodium thiosulfate, 2 mg of triphenylphosphinselenide, solid fine particle dispersion were added, and, 105 mg of ammonium thiocyanate and 12.5 mg of chloro auric acid were added. Further 0.2 mol % of fine particles of silver iodide were added. The emulsion was ripened for 2 hours as a whole. At the completion of ripening 5 mg of 1-phenyl-5-mercaptotetrazole (PMT) was added. The added amount is shown per 1 mol of silver halide.

In accordance with the method of Example 1 of Japanese Patent Open to Public Inspection No. 9-127643, silver behenate was prepared in the following method.

Preparation of Sodium Behenate Solution

To 340 ml of isopropanol, 34 g of behenic acid was dissolved at 65° C. Thereafter, while stirring, an aqueous 25N sodium hydroxide solution was added so that the pH was adjusted to 8.7. At the same time, about 400 ml of an aqueous sodium hydroxide solution were employed. Thereafter, the resulting sodium behenate solution was concentrated under reduced pressure so that the concentration of sodium behenate became 8.8 percent by weight.

Preparation of Silver Behenate

To a solution prepared by dissolving 30 g of ossein gelatin in 750 ml distilled water, a 2.94M silver nitrate solution was added to result in a silver electrical potential of 400 mV. To the resulting solution, 374 ml of the above-mentioned sodium behenate solution was added at a rate of 44.6 ml/minute at 78° C., employing a controlled double-jet method, at the same time, an aqueous 2.94M silver nitrate solution was added to maintain the silver electrical potential at 400 mV. During the addition, the added amounts of sodium behenate and silver nitrate were 0.092 mole and 0.101 mole, respectively.

After the addition, stirring continued for another 30 minutes, and the resulting water-soluble salts were removed using ultrafiltration.

Preparation of Photosensitive Emulsions Em-3c and Em-4c

To the resulting silver behenate dispersion, 0.01 mole of the above-mentioned silver halide emulsion Em-3 (silver halide emulsion) was added. Under constantly stirring, dispersion flocks were formed by gradually adding 100 g of a n-butyl acetate solution containing vinyl acetate (1.2 percent by weight). Subsequently, water was removed and further, water washing and water removal were carried out two more times. Then, with stirring, added was 60 g of a mixture consisting of butyl acetate containing 2.5 weight percent polyvinyl butyral (average molecular weight of 3,000) as a binder and isopropyl alcohol in a ratio of 1:2. Thereafter, a gel-like mixture consisting of behenic acid and silver halide, as prepared above, was added with polyvinyl butyral (average molecular weight of 4,000) as a binder and isopropyl alcohol, and was dispersed. In the same way except that the emulsion Em-4 was employed in place of Em-3, emulsion for comparative Em-4c was prepared.

Onto a support, each layer described below was subsequently applied to prepare thermally developable photosensitive material samples 9–20. Each sample was dried at 75° C. for 5 minutes.

Coating onto Back Side Surface: the composition described below was coated to form a wet thickness of 80 μm.

| | |
|---|---|
| Polyvinyl butyral (10 percent isopropanol solution) | 150 ml |
| Dye-B | 70 mg |
| Dye-C | 70 mg |

Dye-B

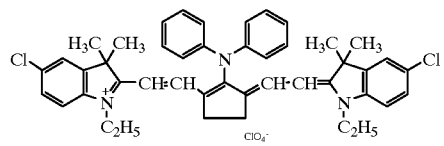

Dye-C

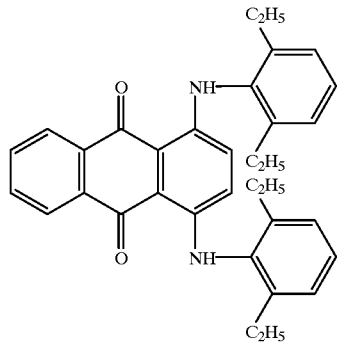

Coating onto the Surface of Photosensitive Layer Surface Side

Photosensitive layer: the composition described below was coated so that the coated silver amount was 2.0 g/m² and polyvinyl butyral as a binder was 3.2 g/m².

| | |
|---|---|
| Emulsion (Em-3c or Em-4c) (shown in Table 3) as silver, amount to make | 3 g/m² |
| Sensitizing dye-1 (shown in Table 3 as well as amount thereof) | |
| Compounds represented by general formula 2 (shown in Table 3 as well as amount thereof) | |
| Compounds represented by general formulas 3 to 5 (shown in Table 3 as well as amount thereof) | |
| Phthalazone (4.5% DMF solution) | 8 ml |
| Developing agent-1 (10% acetone solution) | 13 ml |
| Contrast enhancing agent H (1% methanol:DMF = 4:1 solution) | 2 ml |

Developing agent-1

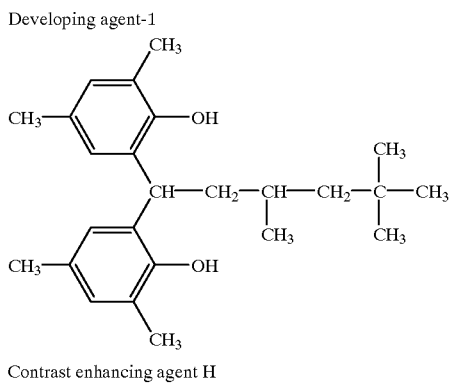

Contrast enhancing agent H

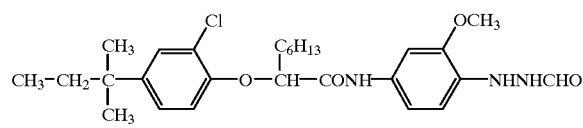

Surface protective layer: the composition described below was coated onto the photosensitive layer so as to obtain a wet thickness of 100 μm.

| | |
|---|---|
| Acetone | 175 ml |
| 2-Propanol | 40 ml |
| Methanol | 15 ml |
| Cellulose acetate | 8.0 g |
| Phthalazine | 1.0 g |
| 4-Methylphthalic acid | 0.72 g |
| Tetrachlorophthalic acid | 0.22 g |
| Tetrachlorophthalic acid anhydride | 0.5 g |
| Compounds represented by general formula 2 (shown in Table 3 as well as amount thereof) | |
| Compounds represented by general formulas 3 to 5 (shown in Table 3 as well as amount thereof) | |
| Monodisperse silica with an average particle diameter of 4 μm 1% (W/W) in respect to binder | |

Sensitometric Evaluation

Each of the thermally developable photosensitive materials prepared as described above was subjected to exposure employing a semi conductor laser of 810 nm. The incline angle of the exposing laser to the surface of the coated sample was 80 degree. The laser power was 150 mW, outputted with longitudinal superposing multimode. Thereafter, the material was subjected to thermal development at 120° C. for 15 seconds employing a heating drum uniformly. The reciprocal of the exposure amount to give a density of 3.0 was referred to as its sensitivity. The evaluation was same as in Example 1. The evaluation were shown as a relative value assuming No. 9 to be 100. A gradient showing the slope of a straight line passing through points of density at 0.1 and 1.5 of the characteristic curve was shown which exhibits the degree of a short toe. The larger value shows the higher contrast. The result is shown in Table 4.

TABLE 3

| Sample No. | Photosensitive Layer | | | Surface Protective Layer | Remarks |
|---|---|---|---|---|---|
| | Photo-sensitive Silver halide Emulsion | Optical sensitizing dye (mol/Ag mol) | Compound of Formulas 2-5 (mmol/Ag mol) | Compound of Formula 2-5 mmol/Ag mol | |
| 9 | Em-4c | Comparative dye B 0.02 | — | Comparative 2 4 | Comp. |
| 10 | Em-4c | I-5 0.02 | Comparative 4 2 | Comparative 3 2 | Comp. |
| 11 | Em-3c | I-11 0.02 | 2-6 3-1 1  2 | — | Inv. |
| 12 | Em-3c | I-9 I-52 0.02 0.002 | 2-16 3-2 1  2 | 2-16 2 | Inv. |
| 13 | Em-3c | I-9 0.02 | 2-5 2 | 3-1 2 | Inv. |
| 14 | Em-3c | I-8 I-40 0.01 0.01 | 2-10 4-2 2  3 | — | Inv. |
| 15 | Em-3c | I-53 0.02 | 2-28 2 | 4-14 2 | Inv. |
| 16 | Em-3c | I-22 0.02 | 2-25 5-1 2  2 | — | Inv. |
| 17 | Em-3c | I-40 0.02 | 5-3 2 | 2-15 4 | Inv. |
| 18 | Em-4c | I-47 0.02 | 3-3 6 | — | Comp. |
| 19 | Em-4c | I-47 0.02 | 4-10 6 | — | Comp. |
| 20 | Em-4c | I-47 0.02 | 5-16 6 | — | Comp. |
| 21 | Em-3c | I-58 0.02 | 2-6 3-1 1  2 | — | Inv. |
| 22 | Em-4c | I-58 0.02 | 3-1 2 | — | Comp. |

Comparative retardant

Comparative 2

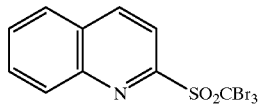

Comparative 3

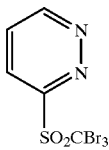

Comparative 4

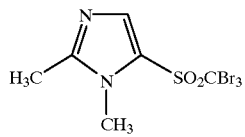

Comparative dye B

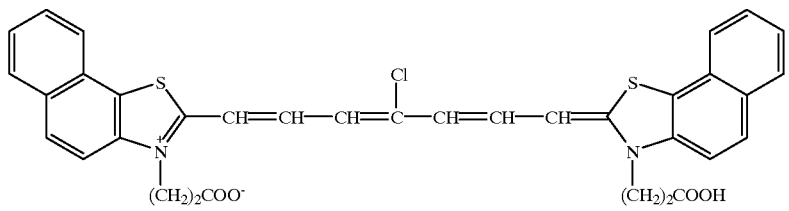

TABLE 4

| Sample No. | Sensitivity | Contrast | Pre-exposure Storage Stability | Image Lasting Quality | Remarks |
|---|---|---|---|---|---|
| 9 | 100 | 100 | 100 | 100 | Comp. |
| 10 | 84 | 91 | 93 | 90 | Comp. |
| 11 | 117 | 114 | 37 | 38 | Inv. |
| 12 | 121 | 119 | 30 | 31 | Inv. |
| 13 | 115 | 115 | 33 | 34 | Inv. |
| 14 | 120 | 118 | 31 | 32 | Inv. |
| 15 | 116 | 115 | 35 | 35 | Inv. |
| 16 | 110 | 107 | 42 | 44 | Inv. |
| 17 | 109 | 105 | 43 | 41 | Inv. |
| 18 | 90 | 96 | 89 | 95 | Comp. |
| 19 | 89 | 95 | 91 | 96 | Comp. |
| 20 | 86 | 94 | 93 | 99 | Comp. |
| 21 | 125 | 115 | 32 | 32 | Inv. |
| 22 | 105 | 100 | 85 | 80 | Comp. |

Table 4 reveals that Samples of the present invention exhibit sufficient sensitivity, excellent contrast property with high gamma, minimum fogging, excellent pre-exposure storage stability of the photosensitive material and excellent image lasting quality.

A thermally developable photosensitive material for a laser imager is, which exhibits high sensitivity, minimum fog, and excellent storage stability of a pre-exposure photosensitive material, and a thermally developable photosensitive material for the output film of an image setter, which exhibits high contrast forming properties, high sensitivity, minimum fog, and excellent storage stability of pre-exposure photosensitive material are provided.

What is claimed is:

1. A thermally developable photosensitive material having a support and an emulsion layer provided thereon comprising a binder, photosensitive silver halide, a reducible silver source, and a reducing agent, wherein the thermally developable photosensitive material comprises at least one of dye represented by Formula I-h, and a compound represented by Formula 2,

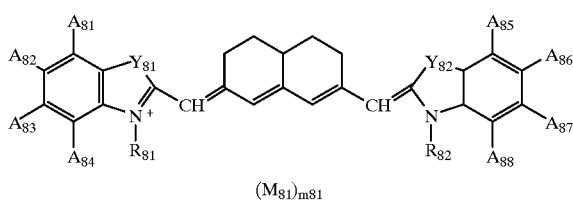

[I-h]

in the formula, each of $Y_{81}$ and $Y_{82}$ represents an oxygen atom, sulfur atom, selenium atom, or $-(NR_0)-$; $R_0$ represents an aliphatic group; each of $R_{81}$ and $R_{82}$ represents an aliphatic group; each of $A_{81}$ to $A_{88}$ represents a hydrogen atom or a substituent; each combination of $A_{81}$ and $A_{82}$, $A_{82}$ and $A_{83}$, $A_{83}$ and $A_{84}$, $A_{85}$ and $A_{86}$, $A_{86}$ and $A_{87}$, $A_{87}$ and $A_{88}$, can form a condensed naphthyl ring by bonding mutually; at least one of $A_{81}$ to $A_{88}$ is a sulfoxide group; $M_{81}$ represents an ion necessary to cancel charges in a molecule; $M_{81}$ represents a number of ions necessary to cancel charges in a molecule;

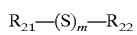 Formula (2)

in the formula, each of $R_{21}$ and $R_{22}$ independently represents an aliphatic group, an aromatic group, or a heterocyclic group; $R_{21}$ and $R_{22}$ may be a group of atoms which can form a ring by bonding with at least one sulfur atom $(S)_m$, and m is an integer of 2 to 6.

2. The thermally developable photosensitive material of claim 1 wherein amount of the dye is $1\times10^{-4}$ to $1\times10^{-3}$ mole per Mole of Ag.

3. The thermally developable photosensitive material of claim 1 wherein amount of the compound represented by Formula 2 is $1\times10^{-8}$ to 1 mole per Mole of Ag.

4. The thermally developable photosensitive material of claim 1 wherein $R_{21}$ and $R_{22}$ are heterocyclic groups.

5. The thermally developable photosensitive material of claim 4 wherein $R_{21}$ and $R_{22}$ are substituted by at least one substituent containing electron attractive groups.

6. The thermally developable photosensitive material of claim 5 wherein $R_{21}$ and $R_{22}$ are substituted by at least one substituent selected from the group consisting of carboxyl group, N-oxide group, and sulfoxide group.

7. The thermally developable photosensitive material of claim 6 wherein the compound represented by Formula (2) is a compound represented by Formula 2–6;

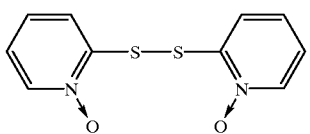

2-6

8. The thermally developable photosensitive material of claim 1 which further comprises at least one compound represented by the Formula 3, 4 or 5,

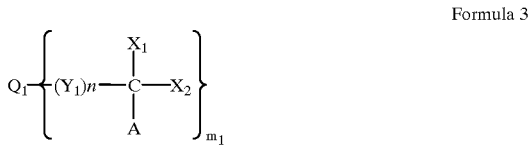

Formula 3 wherein $X_1$ and $X_2$ each represents a halogen atom; $Y_1$ represents a divalent linking group; A represents a hydrogen atom, a halogen atom or another electron attractive group; $m_1$ represents an integer of 3 or 4; $Q_1$ represents a heterocyclic group, an aryl group or an aliphatic group; n represents an integer of 0 to 3, when $Q_1$ represents an aliphatic group, the number of total halogen atoms in a molecule is 6 to 10;

Formula 4 wherein $X_1$, $X_2$ and A each has the same meaning as in Formula 3; $Q_2$ represents an aromatic hetero 5-membered ring having one oxygen atom and 2 or 3 nitrogen atoms, a furan ring, a thiophene ring, or a pyrrole ring; provided that, when $Q_2$ is a thiophene ring, $X_1$ is a bromine atom;

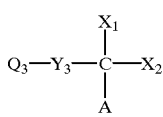

Formula 5 wherein $X_1$, $X_2$ and A each has the same meaning as in Formula 3; $Y_3$ represents —SO—, —SO$_2$—, —CO—, N(R$_{11}$)—SO$_2$—, —N(R$_{11}$)—CO—, —N(R$_{11}$)COO—, —COCO—, —COO—, —OCO—, —OCOO—, —SCO)— —SCOO—, —C(Z$_1$)(Z$_2$)—, alkylene, arylene, a divalent hetero ring or a divalent linking group formed by arbitrary combinations thereof; $R_{11}$ represents a hydrogen atom or an alkyl group; $Z_1$ and $Z_2$ each represents a hydrogen atom or an electron attractive group; $Z_1$ and $Z_2$ shall not both represent hydrogen atoms at the same time; $Q_3$ represents an aliphatic group, an aromatic group or a heterocyclic group; provided that, when $Y_3$ is —SO—, $Q_3$ represents an aromatic 5-membered heterocyclic ring having at least one hetero atom, except for a nitrogen atom, or a pyridine ring group.

9. The thermally developable photosensitive material of claim 8 wherein $R_{21}$ and $R_{22}$ are heterocyclic groups.

10. The thermally developable photosensitive material of claim 8 wherein $R_{21}$ and $R_{22}$ are substituted by at least one substituent containing electron attractive groups.

11. The thermally developable photosensitive material of claim 8 wherein $R_{21}$ and $R_{22}$ are substituted by at least one substituent selected from the group consisting of carboxyl group, N-oxide group, and sulfoxide group.

12. The thermally developable photosensitive material of claim 8 wherein the compound represented by Formula (2) is a compound represented by Formula 2–6:

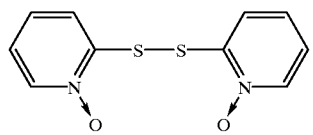

2-6

13. The thermally developable photosensitive material of claim 8 wherein amount of the dye is $1 \times 10^{-4}$ to $1 \times 10^{-3}$ mole per mole of Ag.

14. The thermally developable photosensitive material of claim 3 wherein amount of the compound represented by Formula 2 is $1 \times 10^{-8}$ to 1 mole per mole of Ag.

* * * * *